United States Patent
Gordon et al.

(10) Patent No.: US 12,106,537 B1
(45) Date of Patent: *Oct. 1, 2024

(54) SYSTEM AND METHOD FOR BOUNDING BOX MERGING FOR MORE EFFICIENT SECONDARY ANALYSIS IN VIDEO FRAME PROCESSING

(71) Applicant: Omnilert LLC, Leesburg, VA (US)

(72) Inventors: John Gordon, Alameda, CA (US); Niclas Kurt Gustavsson, Leesburg, VA (US); Chad Thomas Green, Leesburg, VA (US)

(73) Assignee: Omnilert LLC, Leesburg, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/433,804

(22) Filed: Feb. 6, 2024

Related U.S. Application Data

(60) Provisional application No. 63/499,714, filed on May 3, 2023.

(51) Int. Cl.
*G06V 10/25* (2022.01)
*G06V 20/52* (2022.01)

(52) U.S. Cl.
CPC .............. *G06V 10/25* (2022.01); *G06V 20/52* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 10,861,302 B2 * | 12/2020 | Savvides | G06N 20/00 |
| 2018/0047193 A1 * | 2/2018 | Gao | G06T 7/248 |
| 2021/0209402 A1 | 7/2021 | Harrison et al. | |
| 2022/0207266 A1 * | 6/2022 | Wang | G06V 40/161 |

* cited by examiner

*Primary Examiner* — James M Anderson, II
(74) *Attorney, Agent, or Firm* — Marin Patents LLC; Gustavo Marin Marin

(57) ABSTRACT

A device may receive and store video frames in the memory. The device may define, in a video frame among the video frames, a plurality of bounding boxes to visually bound one or more subjects, each bounding box of the plurality of bounding boxes may be defined in accordance with a pre-defined aspect ratio, and each bounding box may comprise padding above and laterally with respect to the one or more subjects in the video frame. The device may reduce the plurality of bounding boxes by merging two bounding boxes among the plurality of bounding boxes to create a merged bounding box, wherein the merged bounding box may maintain the pre-defined aspect ratio and visually bounds the two bounding boxes being merged, and wherein the reduced plurality of bounding boxes is provided to an object detector.

20 Claims, 22 Drawing Sheets

SYSTEM AND METHOD FOR BOUNDING BOX MERGING FOR MORE EFFICIENT SECONDARY ANALYSIS IN VIDEO FRAME PROCESSING

CROSS-REFERENCE TO RELATED APPLICATIONS

This application claims priority to U.S. Provisional Application No. 63/499,714, filed May 3, 2023, the specification of which is hereby incorporated by reference in its entirety.

BACKGROUND OF THE INVENTION

Field of the Art

The disclosure relates to the field of video surveillance, and more particularly to the field of merging bounding boxes in video frames that are used for object detection.

Discussion of the State of the Art

Object detection is performed using computer vision technology that locates and identifies specific types of objects in an image. The objects may be humans, animals, vehicles, specific items such as brands, or materials. Object detection is being increasingly used for application areas such as inventory management, contactless checkouts, traffic analysis and management, product assembly, product improvement, autonomous driving, counting of objects, and safety and compliance application. Object detection works with images and video frames that are captured by cameras.

To analyze the video frames received from cameras, bounding boxes are defined around objects of interest. Bounding boxes are generally rectangles drawn around objects of interest. Algorithms such as Non-Maximum Suppression (NMS) are used to identify the multiple bounding boxes associated with a single object, remove duplicate bounding boxes, and select the best bounding box among the multiple bounding boxes. Processing multiple bounding boxes and selecting the bounding boxes requires complex and expensive processing devices. With the increasing number of video frames being received from multiple cameras, the overall processing of the bounding boxes has an impact on the time taken for object detection.

However, when object detection is used in video surveillance, faster object detection may be critical. Processing a large number of bounding boxes and selecting the best bounding box may require more processing time and detection may be delayed. Hence, there is a need for algorithms that can process video frames using fewer bounding boxes to allow quicker secondary detection and/or object detection.

SUMMARY OF THE INVENTION

Accordingly, the inventor has conceived and reduced to practice, in a preferred embodiment of the invention, a system and method for bounding box merging for efficiency in video frame analysis, the system including: a surveillance computer including a processor, a memory, and a plurality of programming instructions, the plurality of programming instructions when executed by the processor cause the processor to: receive and store video frames in the memory; define, in a video frame among the video frames, a plurality of bounding boxes to visually bound subjects whereby in a preferred embodiment, subjects are people detected within a video frame, each bounding box of the plurality of bounding boxes is defined in accordance to a pre-defined aspect ratio and includes one or more subjects, and; reduce the plurality of bounding boxes by merging two bounding boxes among the plurality of bounding boxes to create a merged bounding box, wherein the merged bounding box maintains the pre-defined aspect ratio and visually bounds the two bounding boxes being merged, wherein each of the reduced plurality of merged bounding boxes includes an additional area above and around the one or more subjects, and wherein the reduced plurality of bounding boxes is provided to an object detector.

In some aspects, the techniques described herein relate to a system, wherein the plurality of programming instructions when executed by the processor, further cause the processor to: responsive to detection of a weapon from the reduced plurality of bounding boxes, generating an alert; and transmitting and rendering the video frame on a display of a user device.

In some aspects, the techniques described herein relate to a system, wherein to create one or more of the merged bounding boxes the plurality of programming instructions when executed by the processor, further cause the processor to identify a degree of overlap between the two or more bounding boxes considered for merging, an initial size of the two or more bounding boxes, and a final size of the merged bounding boxes.

In some aspects, the techniques described herein relate to a system, wherein the plurality of programming instructions when executed by the processor, further cause the processor to skip reduction of the plurality of bounding boxes if a number of the plurality of bounding boxes is below a bounding box threshold.

In some aspects, the techniques described herein relate to a system, wherein the pre-defined aspect ratio is based on the object detection mechanism used by the surveillance computer.

In some aspects, the techniques described herein relate to a system, wherein the pre-defined aspect ratio is based on the environment captured in the video frame.

In some aspects, the techniques described herein relate to a system, wherein the plurality of programming instructions when executed by the processor, further cause the processor to visually bound the maximum number of identified subjects in the minimal number of merged bounding boxes by reducing the plurality of bounding boxes.

In some aspects, the techniques described herein relate to a system, wherein the one or more merged bounding boxes are square.

In some aspects, the techniques described herein relate to a system, wherein the plurality of programming instructions when executed by the processor, further cause the processor to remove duplicate bounding boxes among the plurality of bounding boxes.

In some aspects, the techniques described herein relate to a system, wherein the one or more subjects in the plurality of bounding boxes are spatially centered horizontally with respect to the video frame.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the draw- FIG. 1 is a block diagram illustrating an exemplary hardware architecture of a computing device used in an embodiment of the invention;

DETAILED DESCRIPTION

Figure 1:
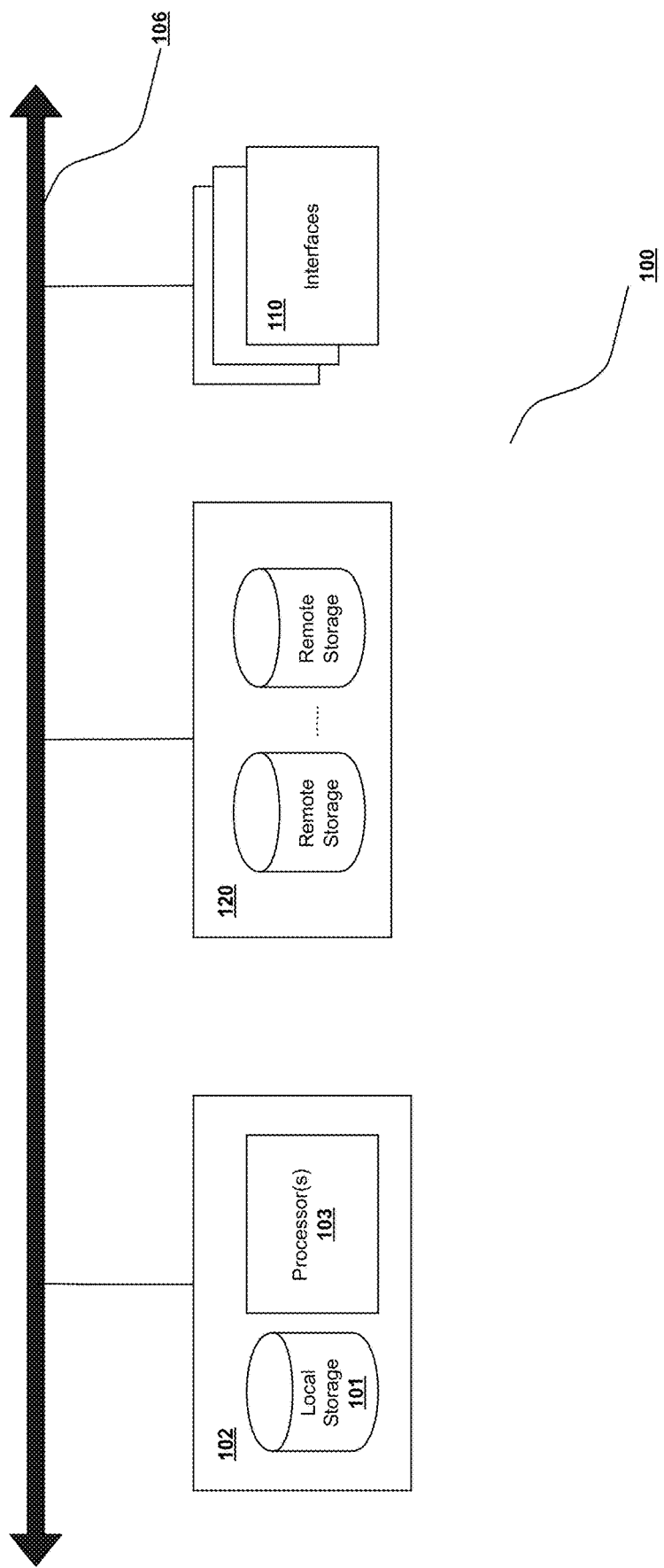

The inventor has conceived and reduced to practice, a system and method for bounding box merging for more efficient secondary analysis in video frame processing. The mechanism involves defining multiple bounding boxes for subjects in video frame, and reducing the number of bounding boxes by merging of bounding boxes. The reduced bounding boxes are used for object detection.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to fully illustrate one or more aspects of the inventions. Similarly, although process steps, method steps, algorithms or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer programming instructions stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more specifically designed computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local storage 101 and/or remote storage 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid-state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
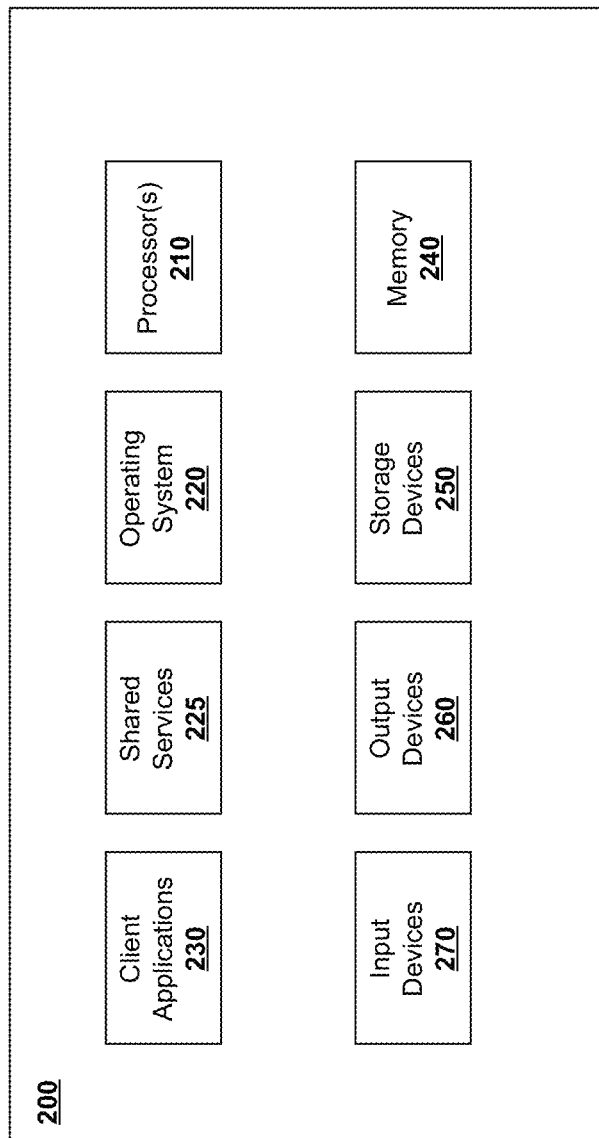
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as, for example, a client application 230. Processors 210 may carry out computing instructions under the control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Shared services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
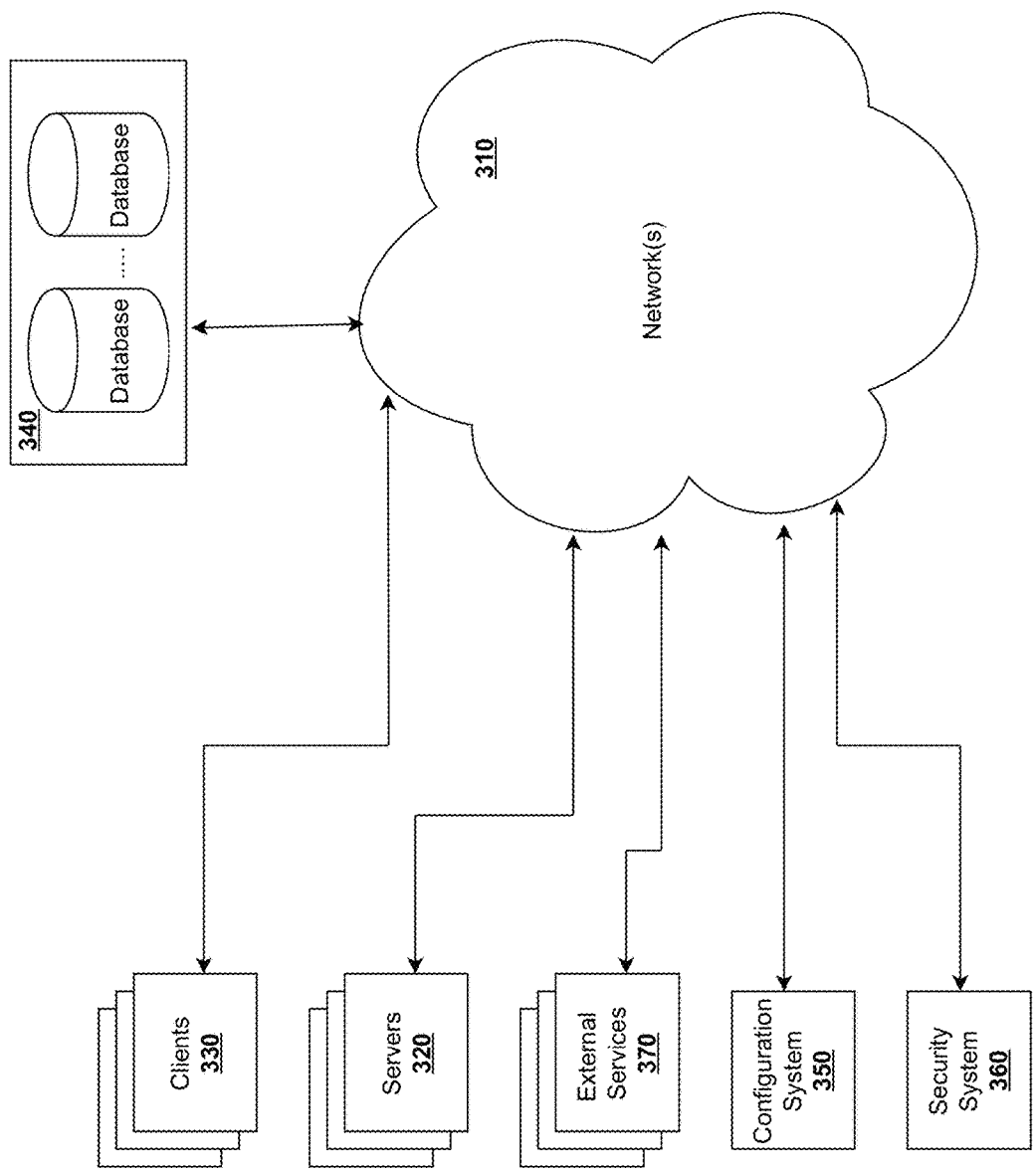
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premise.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments, one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4A:
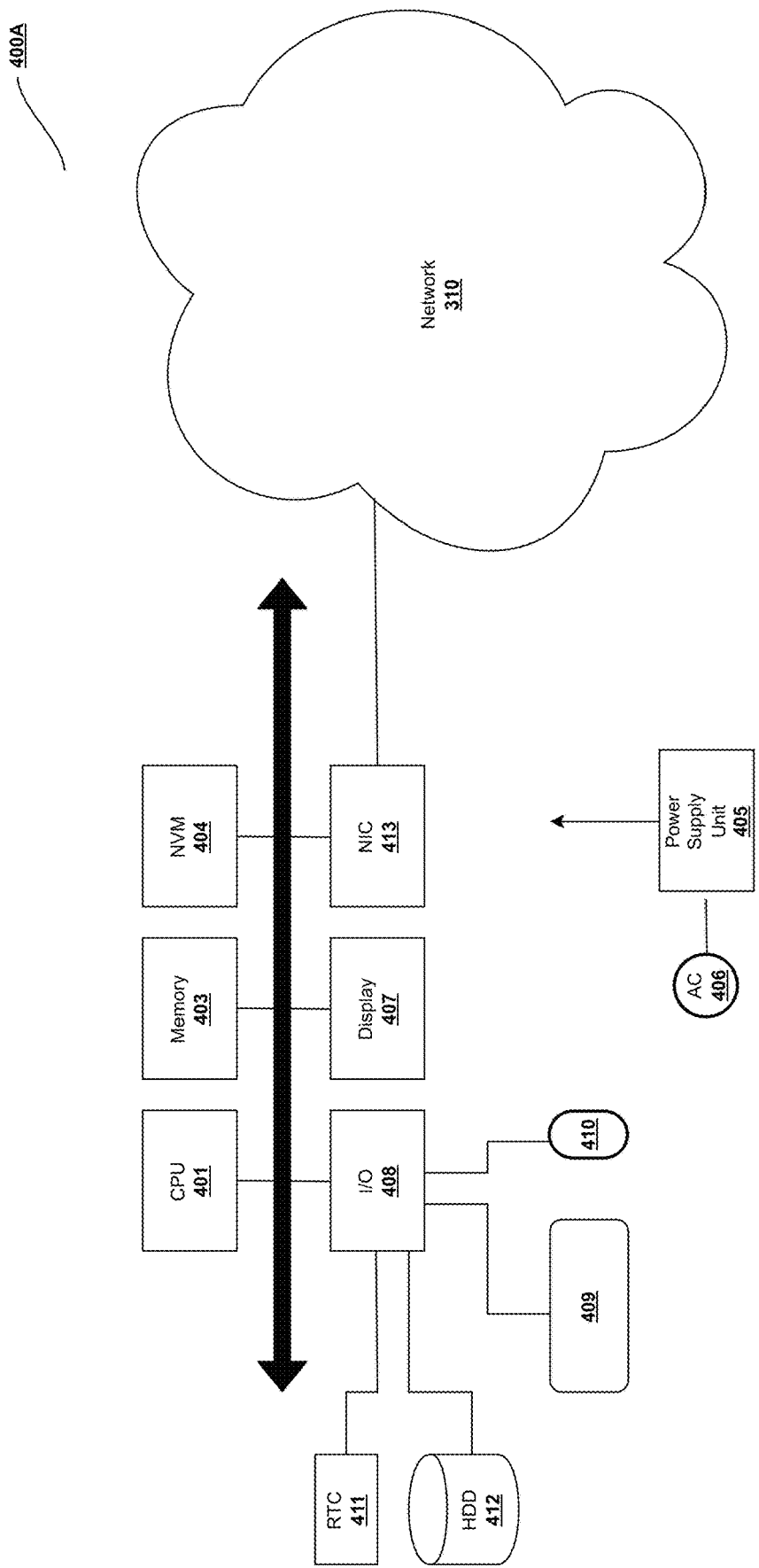
FIG. 4A is another block diagram illustrating an exemplary hardware architecture of a computing device used in various embodiments of the invention.

FIG. 4A shows an exemplary overview of a computer system 400A as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 4B:
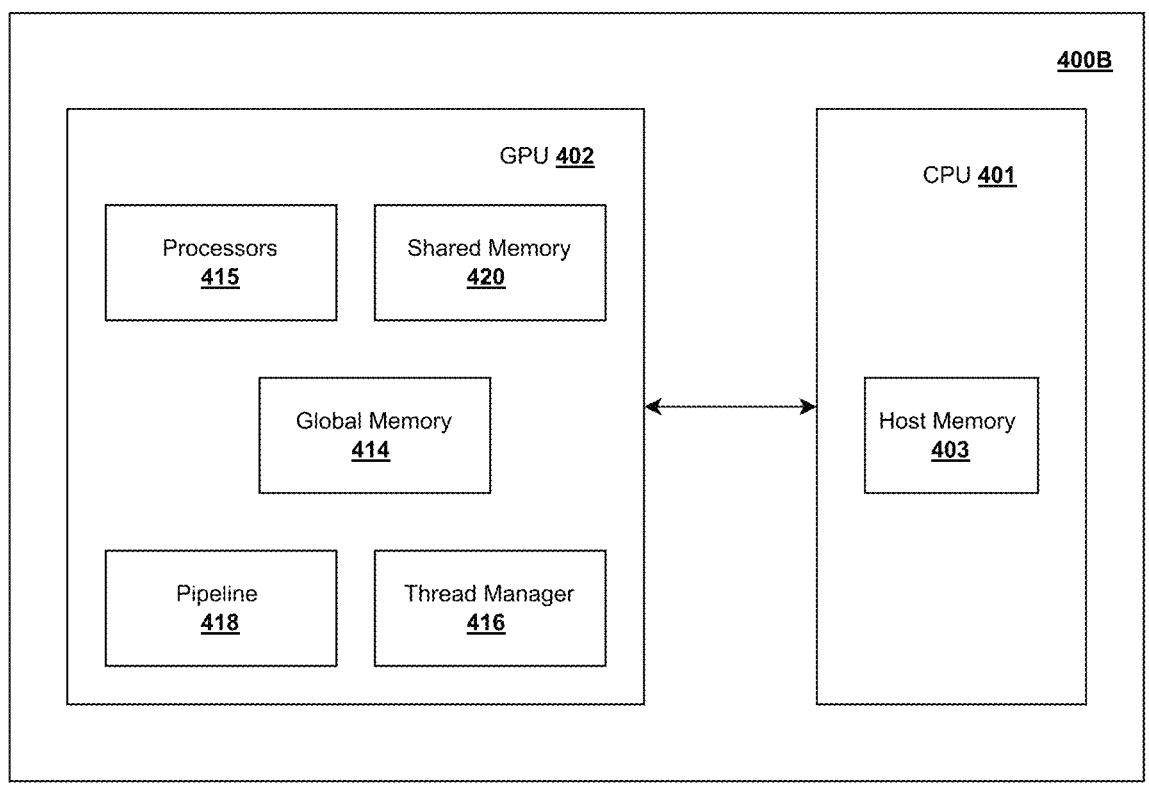
FIG. 4B is a block diagram of a computing system with an integrated graphics processing unit for accelerated performance, according to an embodiment of the invention.

FIG. 4B is a block diagram of a computing system 400B with an integrated graphics processing unit (GPU) 402 for accelerated performance, according to an embodiment of the invention. In an embodiment, GPU 402 is integrated with CPU 401 via PCI express bus. CPU 401 may communicate with GPU 402 via an application code such as Memory-mapped I/O (MMIO).

GPU 402 may be composed of several multiple Single Instruction Multiple data stream (SIMD) processors 415. Each processor 415 may communicate with shared memory 420. Processors 415 in the GPU 402 have direct access to this shared memory 420. Besides shared memory 420, a global memory 414 may be used in the GPU 402. Global memory 414 is the main memory space of the GPU 402 and is allocated, and managed, by the CPU 401, and it is accessible to both the CPU 401 and the GPU 402 and the global memory 414 space may be used to exchange data between the two.

Multithreading is supported by the GPU 402 which executes multiple threads in parallel, which the operating system supports. The threads share single or multiple cores, including the graphics units, the processor, and shared memory 420. Thread manager 416 may include schedulers that group threads in thread blocks that are executed in a parallel fashion. Pipeline 418 may be configured for processing data and generating graphics.

Regarding performance, GPU 402 generally outperforms CPU 402 in artificial intelligence and computer vision applications primarily because GPU 402 may be designed to handle parallel processing tasks more efficiently. Applications that involve large amounts of data, complex calculations, and real-time processing, such as image classification, object detection, and semantic segmentation, run better on GPUs 402. GPUs 402 can process many data points simultaneously, making them better suited for handling the high computational requirements of deep learning and computer vision tasks. GPU 402 may be used in application areas such as image classification, object detection and localization, semantic segmentation, facial recognition, image generation and editing, optical character recognition (OCR), and the like. In the case of video analytics, GPUs 402 may be used for processing data from surveillance cameras, data collected from social media platforms, drones, and other security systems.

Conceptual Architecture

Figure 5:
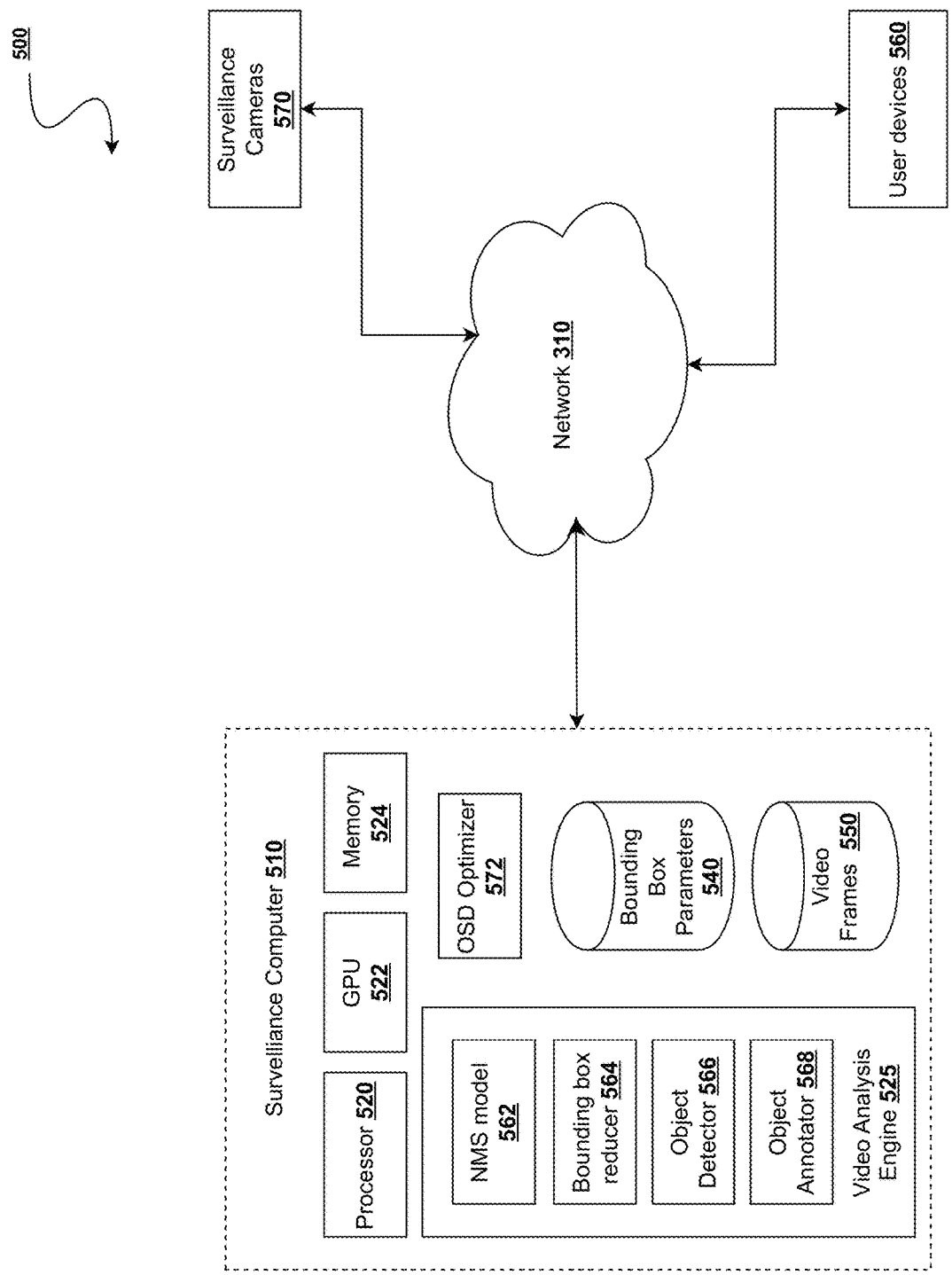
FIG. 5 is an example system including a surveillance computer for processing video frames, according to an embodiment of the invention.

FIG. 5 is an example system 500 including surveillance computer 510 for processing video frames 550, according to an embodiment of the invention. In an embodiment, surveillance computer 510 is in communication with a plurality of user devices 560, video sources (for example, from, terrestrial, aerial, or submersible robots, social media feeds, image, and video repositories, and the like), and surveillance cameras 570 over network 310. The surveillance computer 510 may comprise a plurality of programming instructions stored in a memory 524 and operating on a processor 520 and may be configured to detect objects within received video frames 550 (for example, suspicious objects). A suspicious object as used herein is object that was previously classified and categorized as dangerous by an object detector 566.

Surveillance computer 510 may receive video frames 550 in historical, real-time, or near-real-time from surveillance cameras 570 at multiple locations, and video frames 550 may be stored at surveillance computer 510. Surveillance cameras 570 may include a box-style security camera, a dome security camera, a pan, tilt, and zoom (PTZ) camera, a bullet security camera, a day/night security camera, a thermal camera, a wide-dynamic security camera, or cameras mounted on vehicle capturing images from areas. Surveillance computer 510 may be configured to identify subjects captured in the viewable field of surveillance cameras 570.

Surveillance cameras 570 may include various hardware and/or software to capture a field of view and generate video data including video frames. Surveillance computer 510 configured to receive video frames 550 may utilize a real-time streaming control protocol, such as Real-Time Transport Protocol (RTP), the Real-Time Messaging Protocol (RTMP), or Real-Time Streaming Protocol (RTSP) or any successor or substitute protocols as also standardized by the Internet Engineering Task Force (IETF) or another standards body.

In an embodiment, surveillance computer 510 may include video analytics engine 525 may be configured to perform the functions of an object detection system. Video analysis engine 525 may be configured to process video frames 550 and identify objects. Each video frame among the video frames 550 may be analyzed separately. To process large sets of video frames 550, in addition to the processor 520, surveillance computer 510 may comprise a Graphics Processing Unit (GPU) 522 capable of processing multiple threads for faster processing of video frames 550. In an embodiment, processing video frames 550 may be performed by both CPU (i.e. processor 520) and GPU 522. Processor 520 and GPU 522 may be utilized for specific operations performed in the surveillance computer 510. In an embodiment, communication with user devices 560 and operations related to video frames 550 and bounding box parameters 540 may be supported by processor 520, and operations related to video processing and analysis supported by GPU 522.

Video analysis engine 525 may perform a primary analysis to identify subjects in video frames 550 using bounding boxes. Further, the primary analysis may involve reducing the number of bounding boxes to be analyzed using bounding box reducer 564. A secondary analysis may be performed by object detector 566 to identify suspicious objects.

In an embodiment, video analysis engine 525 may include NMS model 562, bounding box reducer 564, and object detector 566. Video analysis engine 525 may be configured to define bounding boxes around subjects present in each video frame. Each bounding box may include one or more subjects. Video analysis engine 525 may visually bound the maximum number of identified subjects in the minimal number of merged bounding boxes by reducing the plurality of bounding boxes.

In an embodiment, bounding boxes may be rectangular to visually bound subjects in the video frame. Bounding boxes may be used for object detection and for determining the position of objects in a video frame. Bounding boxes may be defined based on the coordinates of their top left, and the bottom right point in the video frame. Each of the plurality of bounding boxes may include an additional area surrounding one or more objects. Each bounding box may have an additional area above and laterally with respect to the subject captured in the bounding box to, for example, capture extremities and any objects comprised within or associated with the extremities. This additional area in the bounding box may aid in the detection of suspicious object, for example, an weapon held by a subject.

Video analysis engine 525 may be configured to define subjects captured by the field of view of surveillance cameras 570. A secondary analysis may be performed on the bounding boxes to identify objects in video frame 550 using object detector 566. In some embodiments, surveillance computer 510 may include machine learning algorithms and computer vision-based algorithms to perform object detection, face detection, weapon detection, and other analysis on video frames 550.

In an embodiment, object annotator 568 may be used for adding masks and labels to the video frames in which objects are detected. Labels are used for identifying objects in video frames. The most common annotation masks are bounding boxes, polygons, keypoints, keypoint skeletons, and 3D cuboids. In an embodiment, object annotator 568 may be an AI-powered tool that adds labels and masks to train AI computer vision models. AI-based annotation tools allow for accurate and quicker labeling of objects in video frames.

In an embodiment, surveillance computer 510 may include an On-Screen Display (OSD) Optimizer 572. OSD optimizer 572 may be configured to analyze annotated video frames and segregate video frames that appear to include suspicious from frames that include everyday objects. For video frames in which objects appear to be everyday objects (non-suspicious), OSD optimizer 572 removes the object annotations and sets the bounding box border width to zero.

In an embodiment, object detector 566 may be configured to detect suspicious objects such as weapons, knives, explosives, and other inappropriate and/or dangerous objects. In an embodiment, object detector 566 may include trained machine learning models to detect and identify suspicious objects in video frames 550. In an embodiment, object detector 566 may be configured to detect weapons. On detection of a weapon by object detector 566, surveillance computer 510 may generate an alert. A video frame in which the weapon is detected may be transmitted and rendered on the display of a user device. A weapon alert may be generated in response to the detection of the weapon. The video may be presented in response to a weapon alert. In an embodiment, video analysis engine 525 may use object detector 566 for automatic detection of guns and firearms. Further, in some cases, deep neural networks may be used by object detectors to identify and classify the weapon used. For example, in the case of guns, object detector 566 may further identify if it is a handgun, shotgun, or semi-automatic rifle.

In cases, where the number of bounding boxes in the video frame is large, a bounding box reducer 564 may be used for reducing the number of bounding boxes in the video frame. Bounding box reducer 564 is configured to generate a reduced set of bounding boxes by merging bounding boxes in each video frame. Bounding box reducer 564 may reduce the number of bounding boxes in the video frame by merging bounding boxes based on a degree of overlap between two bounding boxes. Advantageously, a reduction in bounding boxes provides an improvement over systems known in the art by increasing the speed at which secondary analysis may be executed and thus more video can be processed with less processing capability.

In an embodiment, surveillance computer 510 includes a database with bounding box parameters 540. Bounding box parameters 540 may include various parameters associated with bounding boxes that may be defined within video frames 550. Examples of parameters may include but are not limited to, the initial size of the bounding box, the shape of the bounding box, the aspect ratio of the bounding box, the location of the bounding box, etc. in a video frame. In an embodiment, parameters for defining bounding boxes may be provided by a user device 560. In another embodiment, parameters for bounding boxes may be selected based on the object detector 566. Further, in some embodiments, parameters for bounding boxes may be based on the area in which surveillance is performed.

DETAILED DESCRIPTION OF EXEMPLARY EMBODIMENTS

Figure 6:
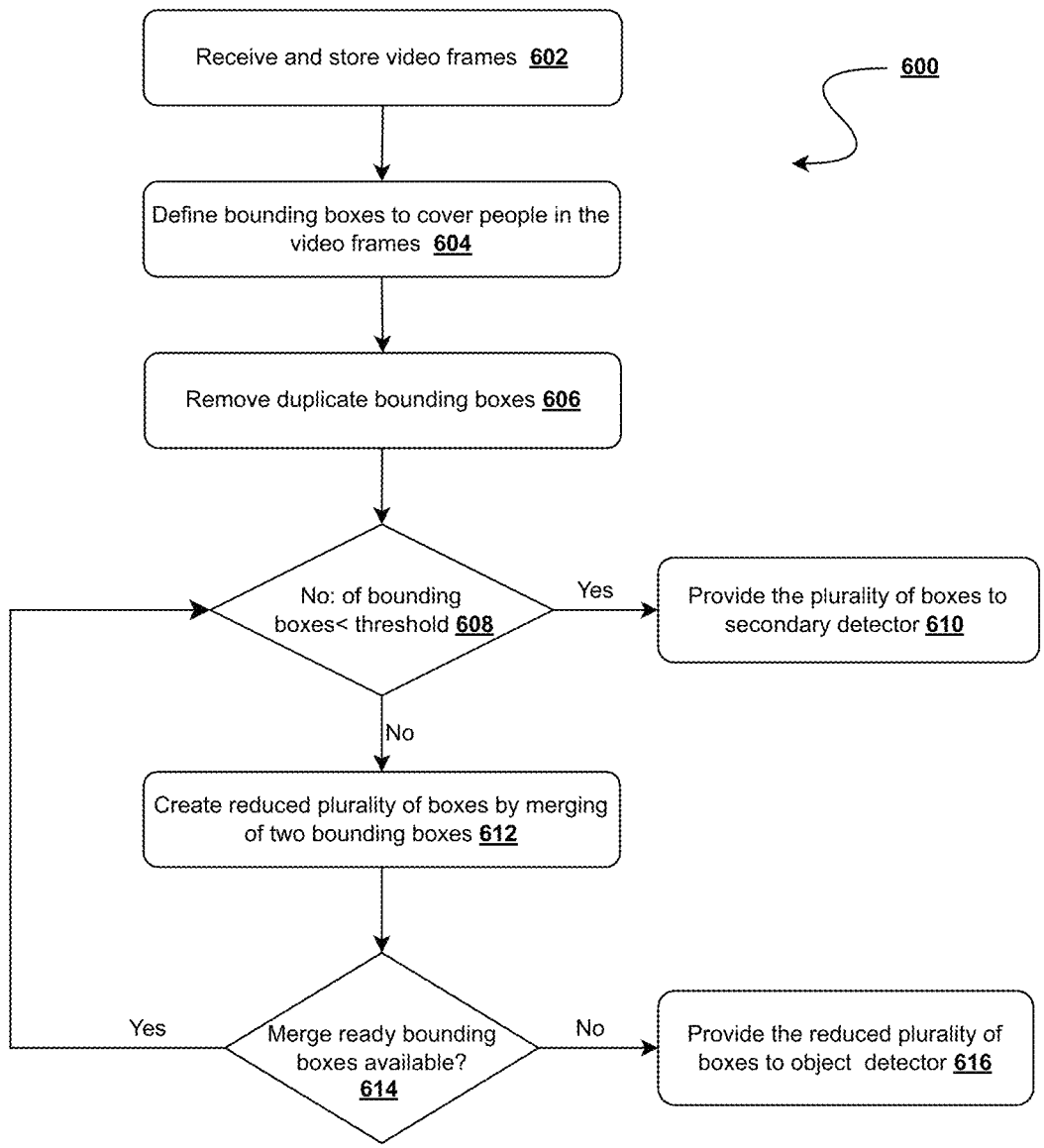
FIG. 6 is a flow diagram of an example method for processing bounding boxes in a video frame, according to an embodiment of the invention.

FIG. 6 is a flow diagram of an example method 600 for processing bounding boxes in a video frame, according to an embodiment of the invention. Steps in method 600 may be performed by video analysis engine 525 using processor 520 and/or GPU 522. According to an embodiment, at step 602, surveillance computer 510 receives and stores the video frames 550. Video frames 550 may be received, stored, and processed in real-time. Video frames 550 stored may include video data from multiple surveillance cameras 570 located in different areas.

In step 604, video analysis engine 525 may be configured to define a plurality of bounding boxes to visually bound the subjects in each frame. Bounding boxes may be of any shape including square, rectangular, polygon, and so on. Bounding boxes may be defined around subjects detected in an analysis of one or more video frames. In an embodiment, bounding boxes may be defined using a pre-defined aspect ratio. The pre-defined aspect ratio may be based on the environment in which the surveillance is performed. In another embodiment, a pre-defined aspect ratio may be based on the requirements of object detector 566 or in some cases received from a user device. In an embodiment, video analysis engine 525 visually bound the maximum number of identified subjects in the minimal number of merged bounding boxes by reducing the plurality of bounding boxes.

In step 606, video analysis engine 525 may remove duplicate bounding boxes among the plurality of bounding boxes. In several instances, multiple bounding boxes around the same subject or groups of subjects are in the video frame. In an embodiment, surveillance computer 510 may utilize NMS model 562 to run a non-maximum suppression algorithm to identify and remove duplicates. With NMS, video analysis engine 525 can compute an intersection-over-union (IoU) ratio for a pair of bounding boxes. If the IoU ratio is higher than a threshold, the video analysis engine 525 may determine that the two bounding boxes are likely to be associated with the same subject or group of subjects.

In step 608, video analysis engine 525 may determine whether the number of bounding boxes is below a bounding box threshold. When the number of bounding boxes is below the bounding box threshold ("Yes" at step 608), then at step 610, the video analysis engine may skip the steps of reducing the bounding boxes. Bounding boxes may be sent to object detector 566 for further processing and detection of suspicious objects.

When the number of bounding boxes is greater than the bounding box threshold ("No" at step 608), video analysis engine 525, at step 612, uses bounding box reducer 564 to reduce the plurality of bounding boxes. The reduction is performed by merging two or more bounding boxes into one. Each of the merged bounding box includes padding above and laterally with respect to subjects visually bounded in the merged bounding boxes. Padding is the additional area in bounding boxes that captures the area above and around the subjects defined by bounding boxes. In an embodiment, padding covers an area above and laterally with respect to the subjects in the bounding boxes. In some embodiments, padding covers an area above and horizontally with respect to the subjects in the bounding boxes. The padding above and laterally with respect to one or more subjects in the video frame captures objects held by one or more subjects.

At step 614, video analysis engine 525 may determine if bounding boxes are capable of being merged are available in the plurality of bounding boxes. When bounding boxes that are capable of being merged are available and the number of bounding boxes is greater than the threshold, the process of merging bounding boxes is continued using steps 608, 612, and 614. The merging of bounding boxes may continue until the merging of bounding boxes is not feasible or based on a computed satisfaction. Since, in a preferred embodiment, no object analysis is performed during the primary analysis (i.e., bounding box definition or duplicate removal), the merging of bounding boxes reduces reprocessing of the same pixels. Details related to the selection of bounding boxes to be merged and the merging of bounding boxes are explained in conjunction with FIG. 7.

At step 616, a reduced plurality of bounding boxes may be provided to object detector 566. The merged bounding boxes from step 612 and/or non-merged bounding boxes from step 610 may be provided to the object detector 566 for secondary processing to identify objects of interest. Secondary analysis of the video frame for the detection of suspicious objects may be performed by object detector 566 after the reduction of bounding boxes, thereby reducing the overload which leads to faster object detection and identification. The faster object detection and identification enables surveillance computer 510 to identify suspicious objects well before the incident. In, for example, several gun-related incidents, there may be a "staging period" where the assailant before assault may brandish their firearms as they move towards the target. With faster processing of video frames 550 and object detection, firearms may be identified, and incidents may be prevented.

In an embodiment, once a set of objects is detected by object detector 566, the set of objects may be fed to NMS model 562 to remove duplicates. Hence, the set of suspicious objects is reduced. User device 560 may receive a smaller set of identified objects. This allows for a substantively quicker review of the identified objects by a user associated with user device 560.

Figure 7:
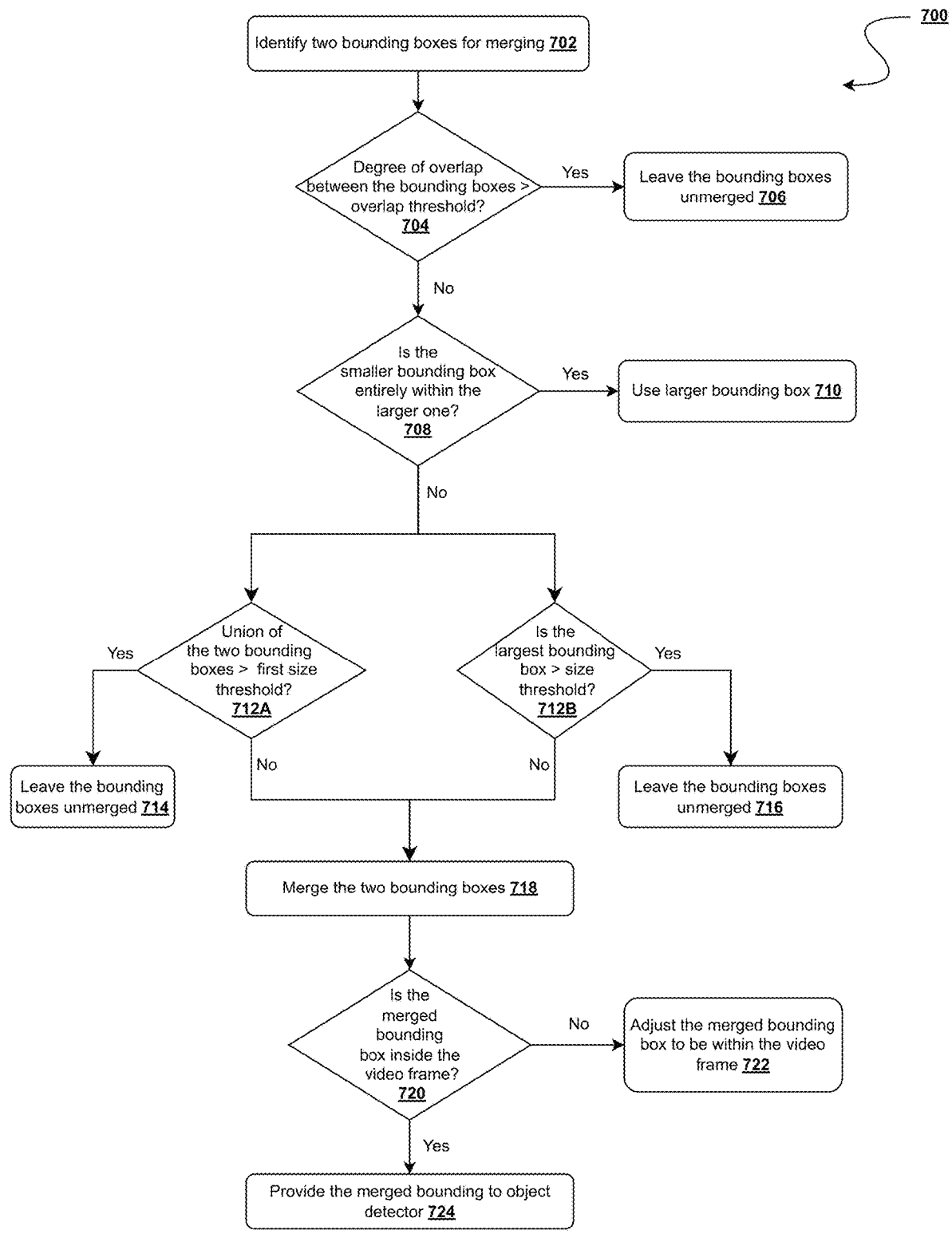
FIG. 7 is a flow diagram of an example method of merging bounding boxes in a video frame, according to an embodiment of the invention.

FIG. 7 is a flow diagram of an example method 700 for merging bounding boxes in a video frame, according to an embodiment of the invention. Steps in method 700 may be performed by bounding box reducer 564 of video analysis engine 525 using processor 520 and/or GPU 522. The plurality of bounding boxes defined in the primary analysis may be reduced by merging bounding boxes based on the overlap. The merging process of bounding boxes generates a reduced plurality of bounding boxes for processing by object detector 566. In step 702, bounding box reducer 564 may identify bounding boxes that may be merged. In an embodiment, two bounding boxes that can be merged may be identified based on a simple degree of overlap, the intersection of union (IOU), or distance IOU.

Once probable candidates for merging are identified, bounding box reducer 564, at step 704, may determine if a degree of overlap between the two bounding boxes is greater than an overlap threshold. The overlap threshold may be defined based on the size requirement of object detector 566. In an embodiment, when bounding box reducer 564 determines that degree of overlap between the two bounding boxes is greater than the overlap threshold, the two bounding boxes may be left unmerged at step 706. In another embodiment, when video analysis engine 525 determines that the degree of overlap between the two bounding boxes is not greater than the overlap threshold, the method moves to step 708. At step 708, video analysis engine 525 may use bounding box reducer 564 to determine if a smaller bounding box is entirely within the larger one. When one of the bounding boxes is smaller than the other bounding box and fits within the other bounding box, then at step 710, the larger bounding box is selected among the two bounding boxes.

When a smaller bounding box does not fit into the larger bounding box, bounding box reducer 564 may determine, at step 712A, whether the union of two bounding boxes results in a merged bounding box that is greater than a first size threshold. The first size threshold may be determined based on the size requirement for bounding boxes set by object detector 566. When the union of two bounding boxes results in a merged bounding box that is greater than the first size threshold, the two bounding boxes may be left unmerged at step 714. When the union of two bounding boxes results in a merged bounding box that is smaller than the first size threshold, the two bounding boxes may be merged at step 718.

At step 712B, video analysis engine 525 may use bounding box reducer 564 to determine whether the largest bounding box is greater than a second size threshold. The second size threshold may be a size threshold for individual bounding boxes. In an embodiment, if the largest bounding box is too big, the two bounding boxes may be left unmerged at step 716. When the largest bounding box is smaller than the second size threshold, the two bounding boxes may be merged at step 718. In an embodiment steps 712A and 712B may be performed simultaneously. In another embodiment, either step 712A or 712B may be performed.

The merging of two bounding boxes programmatically and visually bounds the subjects present in each of the two bounding boxes. In an embodiment, the merged bounding box may include a square shape. Size, Shape, aspect ratio, and other parameters of the merged bounding box may be based on resolutions, pre-configurations, and requirements of object detector 566.

At step 720, once the merged bounding boxes are created, video analysis engine 525 may use bounding box reducer 564 to determine if the merged bounding box visually bounding the two bounding boxes is within the video frame. When video analysis engine 525 determines that the merged bounding box is within the video frame at step 720, then at step 724, the merged bounding box is provided to object detector 566 for secondary processing of the video frame.

Upon bounding box reducer 564 determining that the merged bounding box is not within the video frame at step 720, then at step 722 merged bounding box may be adjusted to be fully within the video frame. After the adjustment, the merged bounding box is provided to object detector 566 in step 724. The merging of bounding boxes results in a reduced plurality of bounding boxes. Steps 702 to 724 may be repeated with different sets of bounding boxes until bounding boxes capable of merging are available. When there is no option for merging, the reduced plurality of bounding boxes may be provided to object detector 566 for secondary analysis.

Figure 8:
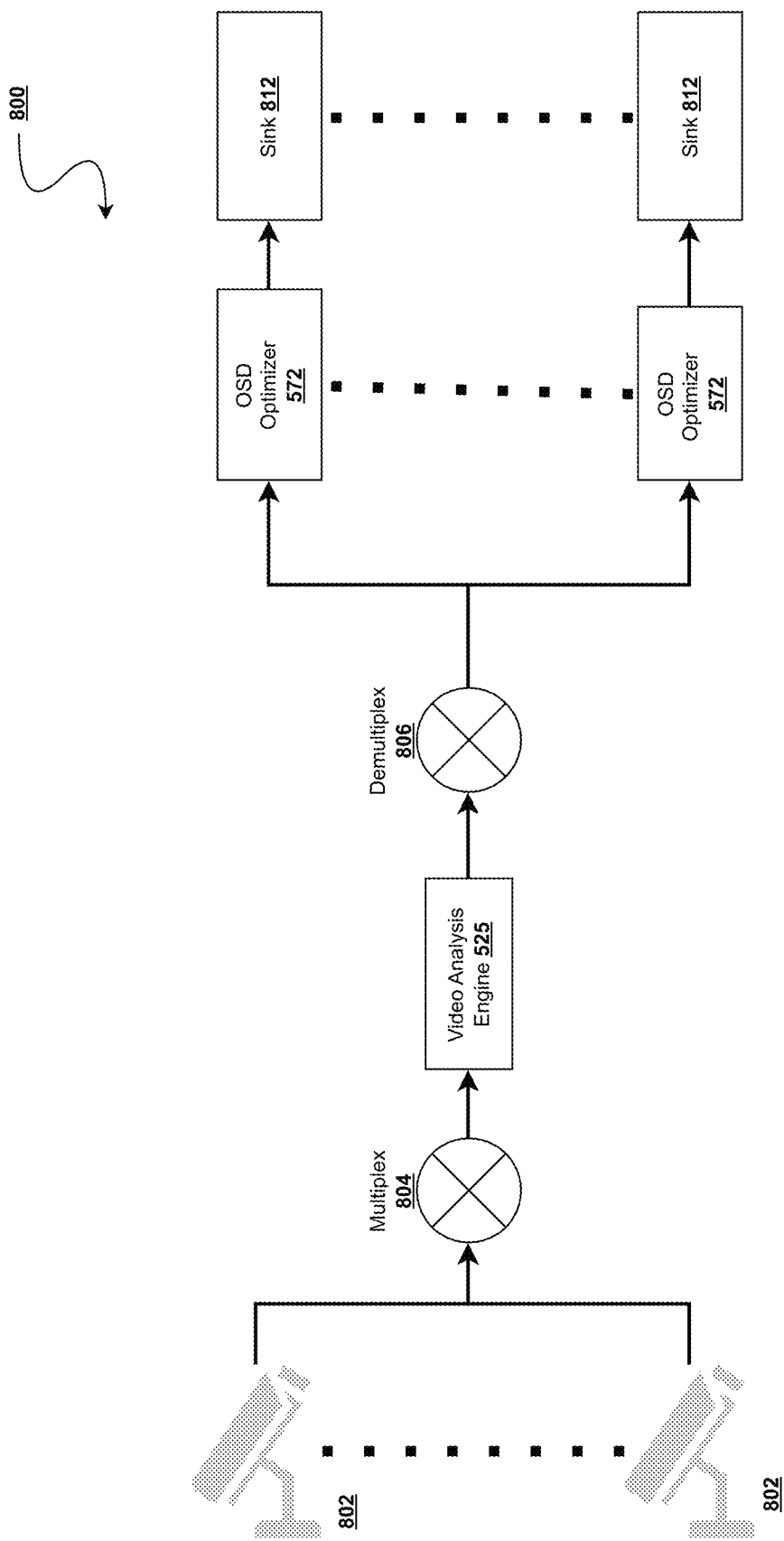
FIG. 8 is a block diagram illustrating a computing environment used for object detection, according to an embodiment of the invention.

FIG. 8 is a block diagram illustrating a computing environment 800 used for object detection, according to an embodiment of the invention. In an embodiment, block diagram 800 depicts components used in a DeepStream implementation for real-time detection of suspicious objects in images and videos. Computing Environment 800 may be designed to support weapon detection in which images/video frames are being received from multiple cameras in complex and crowded environments. In an embodiment, the complex and crowded environment may include schools, workplaces, retail outlets, restaurants, entertainment venues, religious gatherings, government or military centers, or any public place. The performance of the object detection mechanism implemented by surveillance computer 510 is based on the speed of inference (detection of objects in frames per second (fps).)

Surveillance cameras 802 shown in FIG. 8 may be similar to surveillance cameras 570. Data from surveillance cameras 802 may be multiplexed using multiplexer 804 and supplied to the video analysis engine 525 of surveillance computer 510. The output of the video analysis engine 525 is provided to OSD optimizer 572. In an embodiment, the output of the video analysis engine 525 may be a list of objects that are detected and classified by object detector 566. The output of the video analysis engine 525 may be de-multiplexed using demultiplexer 806 and provided to OSD optimizer 572. On-screen display rendering is performed by processor 520. Sinks 812 connects the output from OSD optimizer 572 to a device rendering the video frames. Sinks are designed to support parallel processing using multiple GPUs.

OSD optimizer 572 may be configured to reduce the number of frames being rendered by surveillance computer 510. In cases where annotated frames are provided for a live view, video frames may be rendered continuously. Further, video frames and images to be rendered are copied into memory 524 of the processor 520 from GPU 522 when rendering is performed. This makes the operation of surveillance computer 510 computationally high and makes the overall processing and rendering of video frames slower. In an embodiment, OSD optimizer 572 may be configured to analyze annotated video frames and segregate video frames that appear to include suspicious objects from frames that include everyday objects. For video frames in which objects appear to be everyday objects (non-suspicious), OSD optimizer 572 removes the object annotations and sets the bounding box border width to zero. Sinks 812 designed for transmission from GPU 522 to processor 524 may drop the transmission of the video frames which have bounding boxes with zero width.

Figure 9:
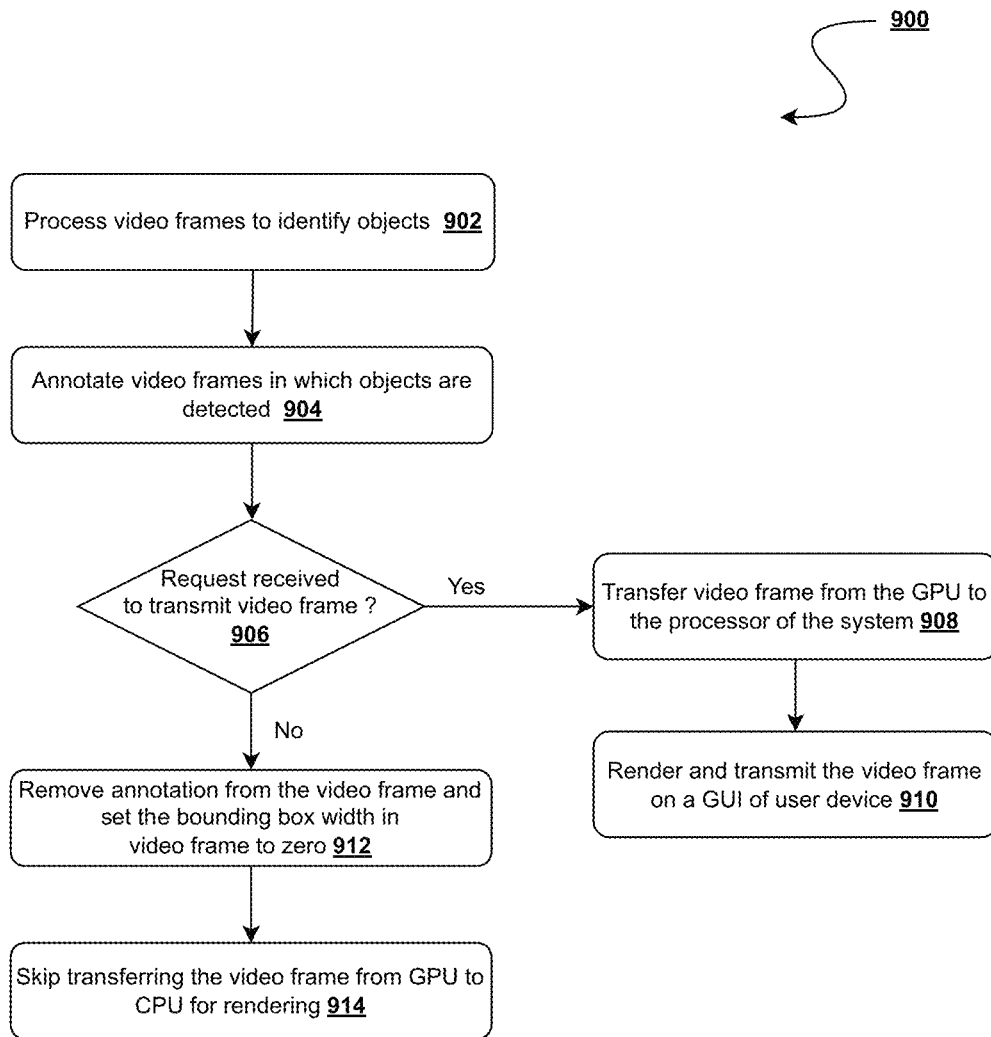
FIG. 9 is a flow diagram of an example method of On Screen Display (OSD) optimization after object detection, according to an embodiment of the invention.

Referring now to FIG. 9, a flow diagram of an example method 900 of OSD optimization after object detection, according to an embodiment of the invention. The steps of method 900 may be performed by the video analysis engine 525 in surveillance computer 510 using GPU 522 and/or processor 520.

At step 902, video analysis engine 525 processes receive video frames 550 and identifies objects in the video frame. The method of processing video frames 550 and object detection is described in FIGS. 6 and 7.

At step 904, video analysis engine 525 may use object annotator 568 to annotate video frames in which objects are detected. Video frames 550 in which objects are detected are annotated by adding rectangular bounding boxes, labels, and text. The annotations are overlaid on video frame 550. Further, the resulting video feed being transmitted may have bounding box predictions from the object detection network overlaid on it.

At step 906, video analysis engine 525 may determine if a suspicious object is identified in a video frame. If a suspicious object is identified, then at step 908, the video frame may be copied from GPU 522 to the memory 524 of processor 520. At step 908, processor 520 may render video frames with suspicious objects on the graphical user interface of a user device.

At step 906, when video analysis engine 525 determines that objects identified in the video frame are non-suspicious, then at step 912, OSD optimizer 572 may remove annotation from the video frames and may set the bounding box width to zero in the video frame.

At step 914, processor 520 may skip the transfer of video frames from GPU 522 to processor 520 for rendering. In an embodiment, a library responsible for rendering the information of frames ignores video frames in which any bounding box has a zero-width border or where text is null. When there is no information to be rendered, there is no copying of the image buffer between GPU 522 and processor 520. The removal of labels, zero-width bounding boxes, and non-rendering of all the video frames reduces the computation load of the surveillance computer 510 and improves the accuracy and speed of object detection.

In an embodiment, inference speed refers to the time taken to process video frames and render identified objects. Consider an example, when a live view is being rendered on a graphical user interface and thirty surveillance cameras are running at thirty frames per second (fps). Without OSD optimization, the number of video frames that are processed and rendered each second is nine hundred video frames, and with OSD optimization only thirty frames are processed and rendered is ninety fps. This is a signification reduction in the number of video frames inferred at the same time. Hence, the resources required by surveillance computer 510 can be reduced. A small-size implementation of surveillance computer 510 (with a smaller GPU) may be capable of processing datasets from a large number of cameras with an increased fps.

Figure 10:
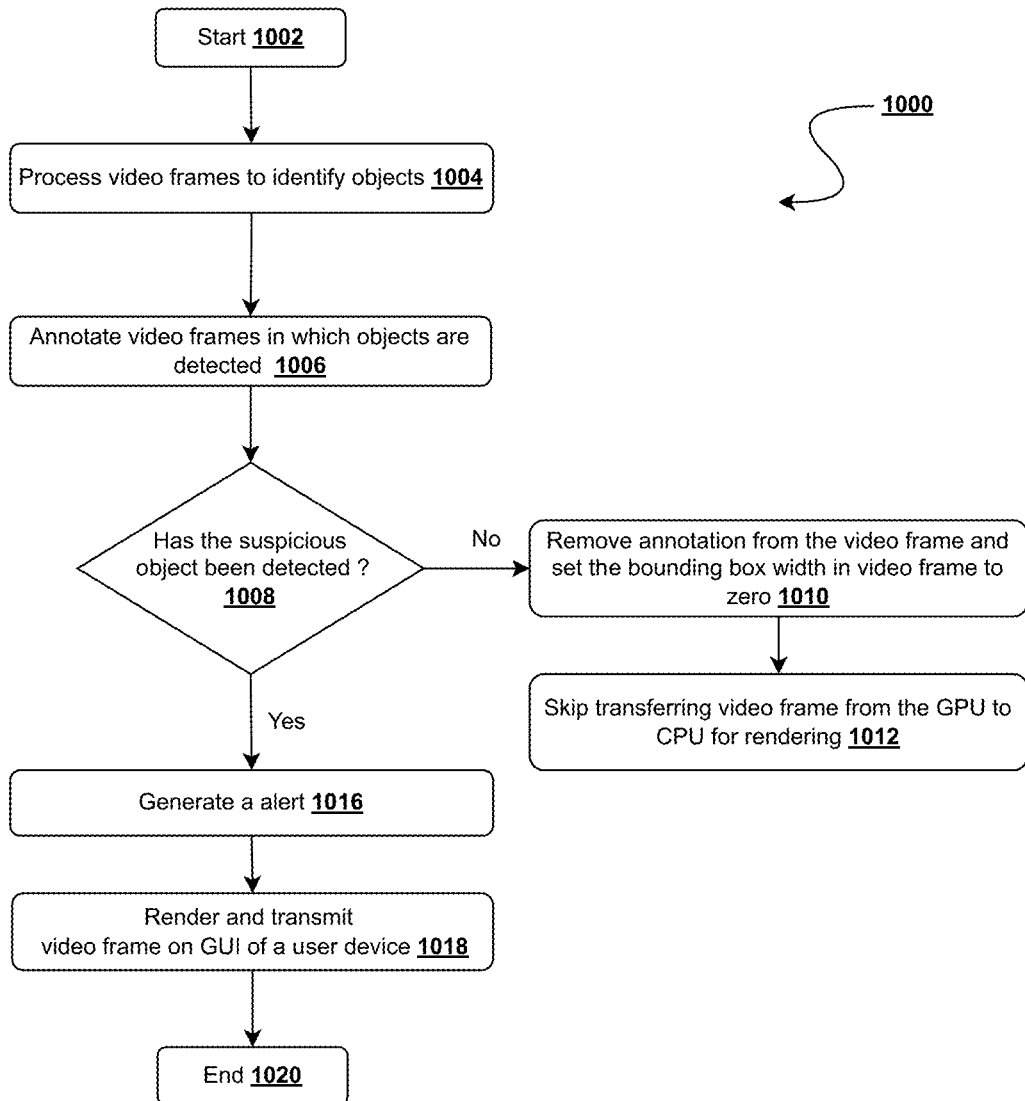
FIG. 10 is a flow diagram of an example method illustrating rendering video frame on a display device, according to an embodiment of the invention.

FIG. 10 is a flow diagram of an example method 1000 illustrating rendering video frames on a user device, according to an embodiment of the invention. The steps of method 1000 may be performed by video analysis engine 525. At step 1004, video analysis engine 525 processes received video frames 550 and identifies objects in video frames. The method of processing video frames 550 and object detection is described in FIGS. 6 and 7.

At step 1006, video analysis engine 525 may use object annotator 568 to annotate video frames in which objects are detected. Video frames 550 in which objects are detected are annotated by adding rectangular bounding boxes, labels, and text. The annotations are overlaid on video frame 550. Further, the resulting video feed being transmitted may have bounding box predictions from the object detection network overlaid on it.

At step 1008, video analysis engine 525 may determine if a suspicious object is identified in a video frame. At step 1016, video analysis engine 525 may determine if a suspicious object has been reported. If the suspicious object has not been reported the video frame is copied from GPU 522 to the memory 524 of processor 520. At step 1018, processor 520 may render video frames with suspicious objects on a display along with an alert.

At step 1008, when video analysis engine 525 determines that the objects identified in the video frame are non-suspicious, then at step 1010, video analysis engine 525 may use OSD optimizer 572 may remove annotation from the video frames and set the bounding box width to zero for the video frame.

At step 1012, processor 520 may skip the transfer of video frames from GPU 522 to processor 520 for rendering. The removal of labels, zero-width bounding boxes, and non-rendering of all the video frames reduces the computation load of the surveillance computer 510 and improves the accuracy and speed of object detection.

Figure 11:
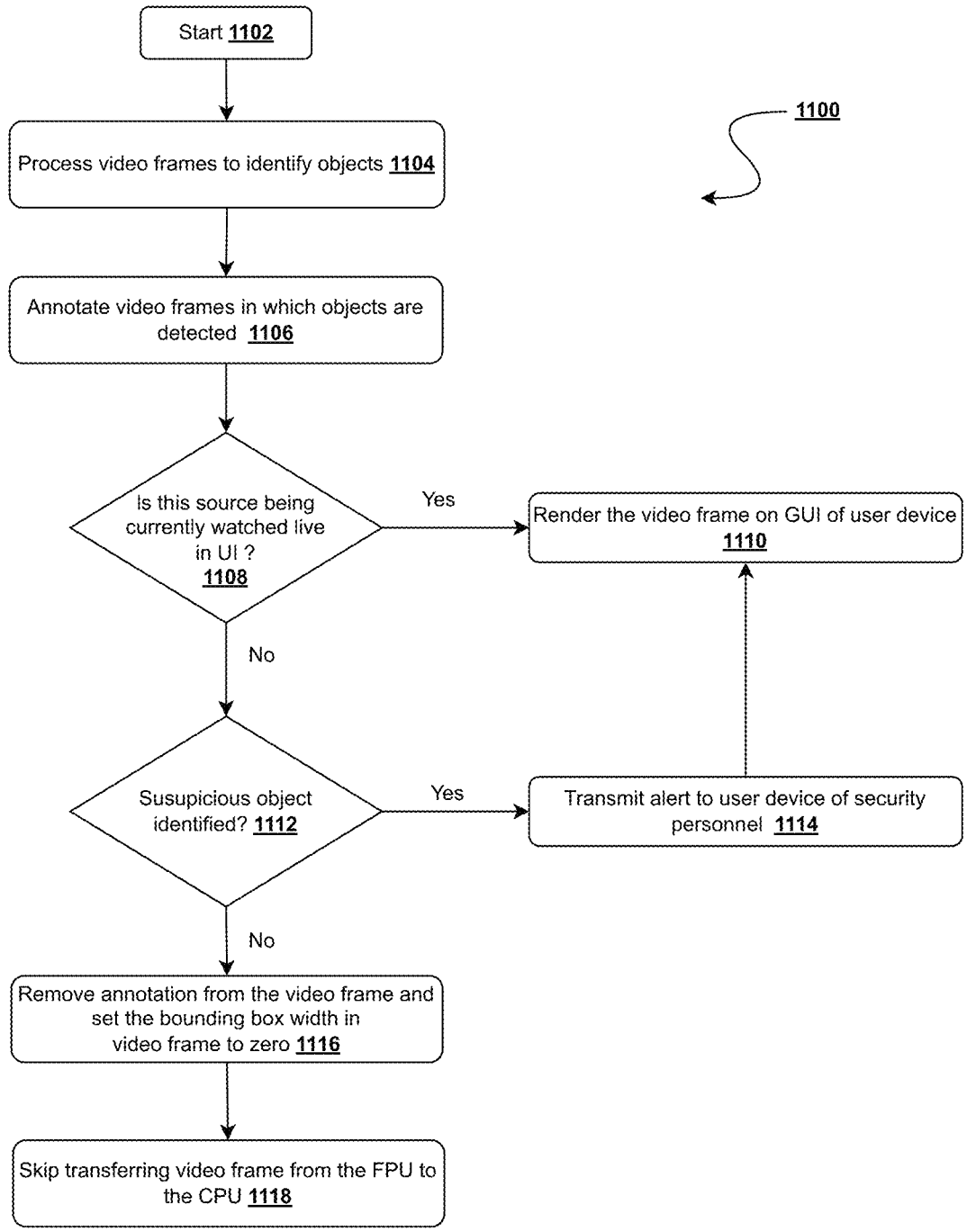
FIG. 11 is a flow diagram of another example method illustrating rendering video frame on a display device, according to an embodiment of the invention.

FIG. 11 is a flow diagram of another example method 1100 illustrating rendering video frame on a display device, according to an embodiment of the invention. The method of step 1100 may be performed by video analysis engine 525. At step 1104, video analysis engine 525 processes receive video frames 550 and identifies objects. The method of processing video frames 550 and object detection is described in FIGS. 6 and 7.

At step 1106, video analysis engine 525 may use object annotator 568 to annotate video frames in which objects are detected. Video frames 550 in which objects are detected are annotated by adding rectangular bounding boxes, labels, and text. The annotations are overlaid on video frame 550. Further, the resulting video feed being transmitted may have bounding box predictions from the object detection network overlaid on it.

At step 1108, video analysis engine 525 may determine if a suspicious object is identified in a video frame. At step 1108, when video analysis engine 525 determines that the objects identified in the video frame are non-suspicious, then at step 1110, video analysis engine 525 may use OSD optimizer 572 may remove the annotation from the video frames and set the bounding box width to zero for the video frame. At step 1112, processor 520 may skip the transfer of video frames from GPU 522 to processor 520 for rendering. If the suspicious object has not been reported the video frame may not be copied from GPU 522 to the memory 524 of processor 520. The removal of labels, zero-width bounding boxes, and non-rendering of all the video frames reduces the computation load of the surveillance computer 510 and improves the accuracy and speed of object detection.

At step 1114, video analysis engine 525 may determine if the video source is being watched live on a user interface (UI). At step 1018, when the video source is being viewed live processor 520 may render video frames with suspicious objects on a display. At step 1118, when the video source is not being watched live, processor 520 may transmit an alert to a device of security personnel.

Figure 12A:
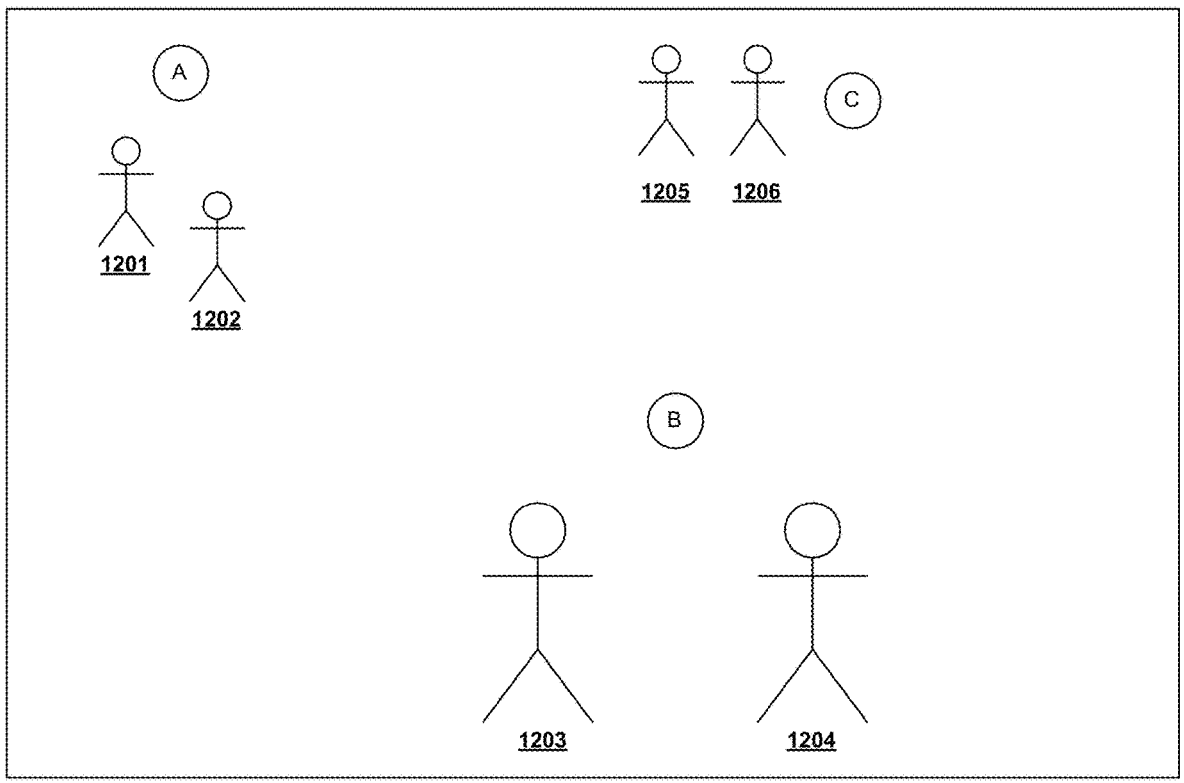
FIGS. 12A-12D depict an exemplary process of merging bounding boxes using an example video frame, according to an embodiment of the invention.
Figure 12B:
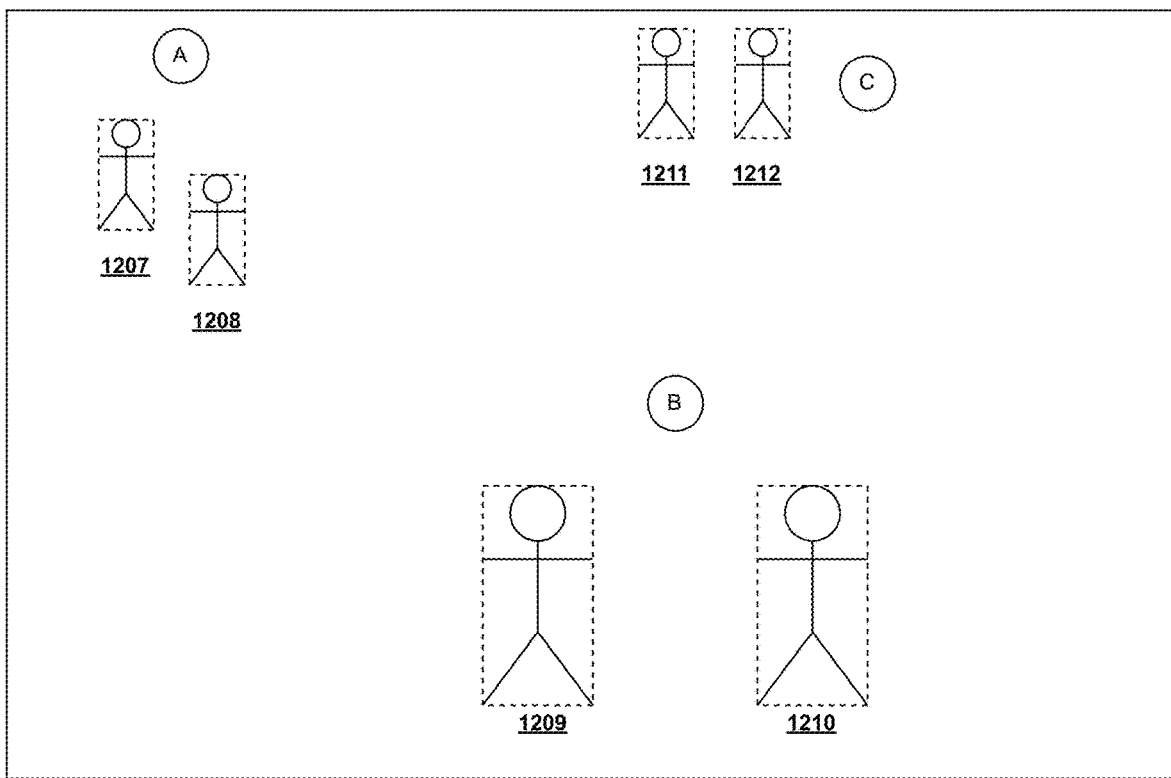

FIGS. 12A-12D depicts an exemplary process of merging bounding boxes using an example video frame, according to an embodiment of the invention. FIG. 12A depicts subjects seen in a video frame. Based on the distance between subjects, the subjects in the video frame may be categorized into, for example, 3 sets: set A, set B, and set C. Set A in the video frame shows includes two subjects 1201 and 1202 who are close to each other. Set B in the video frame includes two subjects 1203 and 1204 that are separated by a distance. Set C in the video frame includes two subjects 1205 and 1206 who are next to each other. FIG. 12B depicts bounding boxes that may be defined around subjects in each of the sets A, B, and C. In set A, bounding boxes 1207 and 1208 are defined around respective subjects. In set B, bounding boxes 1209 and 1210 are defined around respective subjects. In set C, bounding boxes 1211 and 1212 are defined around respective subjects.

Figure 12C:
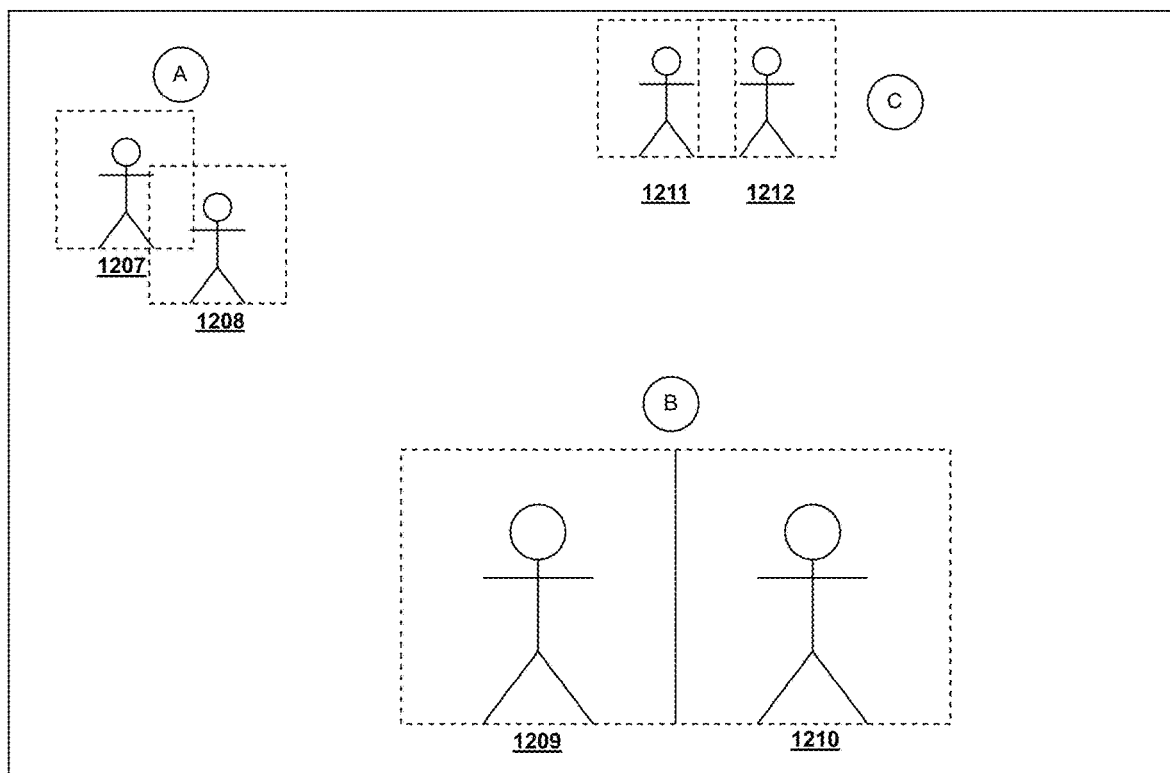

FIG. 12C depicts a scenario in which two bounding boxes in each of the sets A, B, and C may be considered for merging based on the degree of overlap. FIG. 12C is described in conjunction with FIG. 12B. Set A includes bounding boxes 1207 and 1208. Set B includes bounding boxes 1209 and 1210. Set C includes bounding boxes 1211 and 1212. Bounding box reducer 564 may perform steps in method 700 to determine which of the bounding boxes should be combined.

Figure 12D:
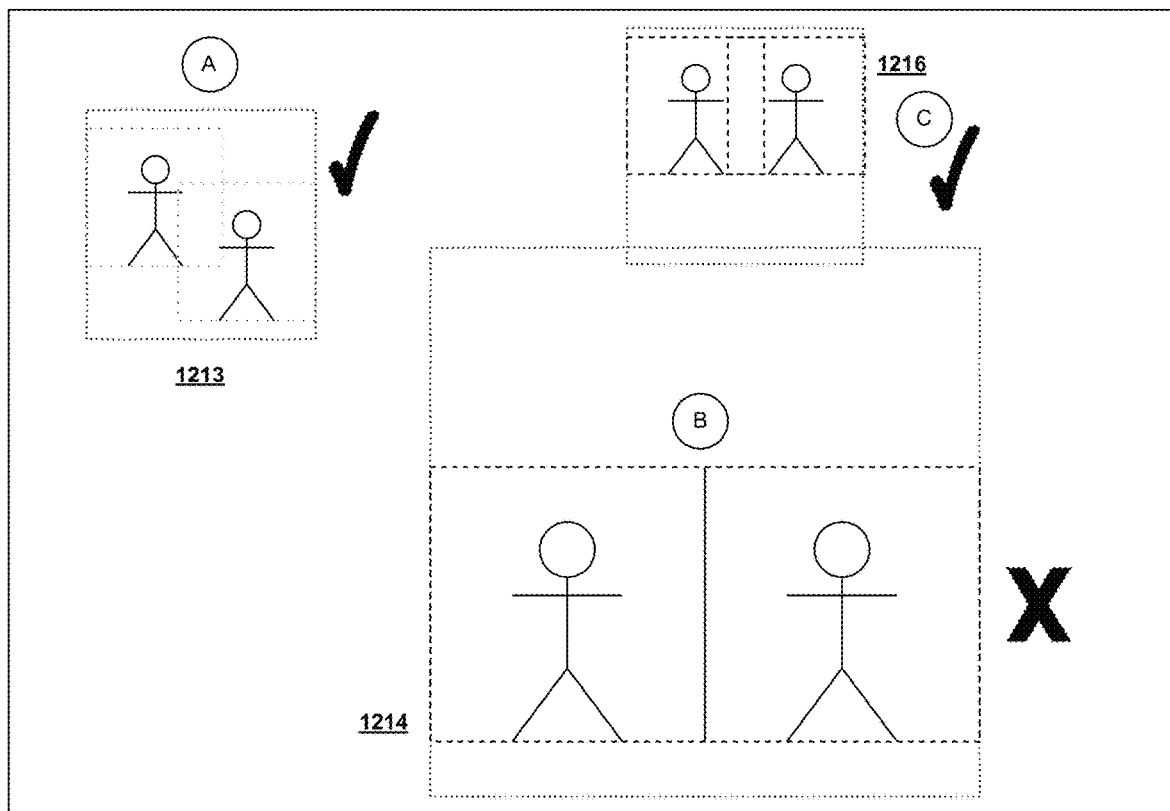

FIG. 12D depicts merged bounding boxes that may be created. The merged bounding box 1213 includes the bounding boxes 1207 and 1208 of set A shown in FIG. 12B. As both bounding boxes 1207 and 1208 are overlapping, a merged bounding box 1213 with a pre-defined aspect ratio may be created. Merged bounding box 1216 includes bounding boxes 1211 and 1212 of set C. As both bounding boxes 1211 and 1212 are in proximity to each other and the merged bounding box is not too large, merged bounding box 1216 may be created. In an embodiment, bounding boxes 1209 and 1210 may be large and the merging of boxes may result in an inefficiently large merged bounding box 1214.

Accordingly, bounding boxes 1209 and 1210 may be left unmerged since the large merged bounding box 1210 may be inefficient during secondary analysis. The process of determining whether a bounding box is too large for merging may be based on a pre-configured or dynamic threshold based on performance factors, pre-configurations, resources, and the like.

Figure 13:
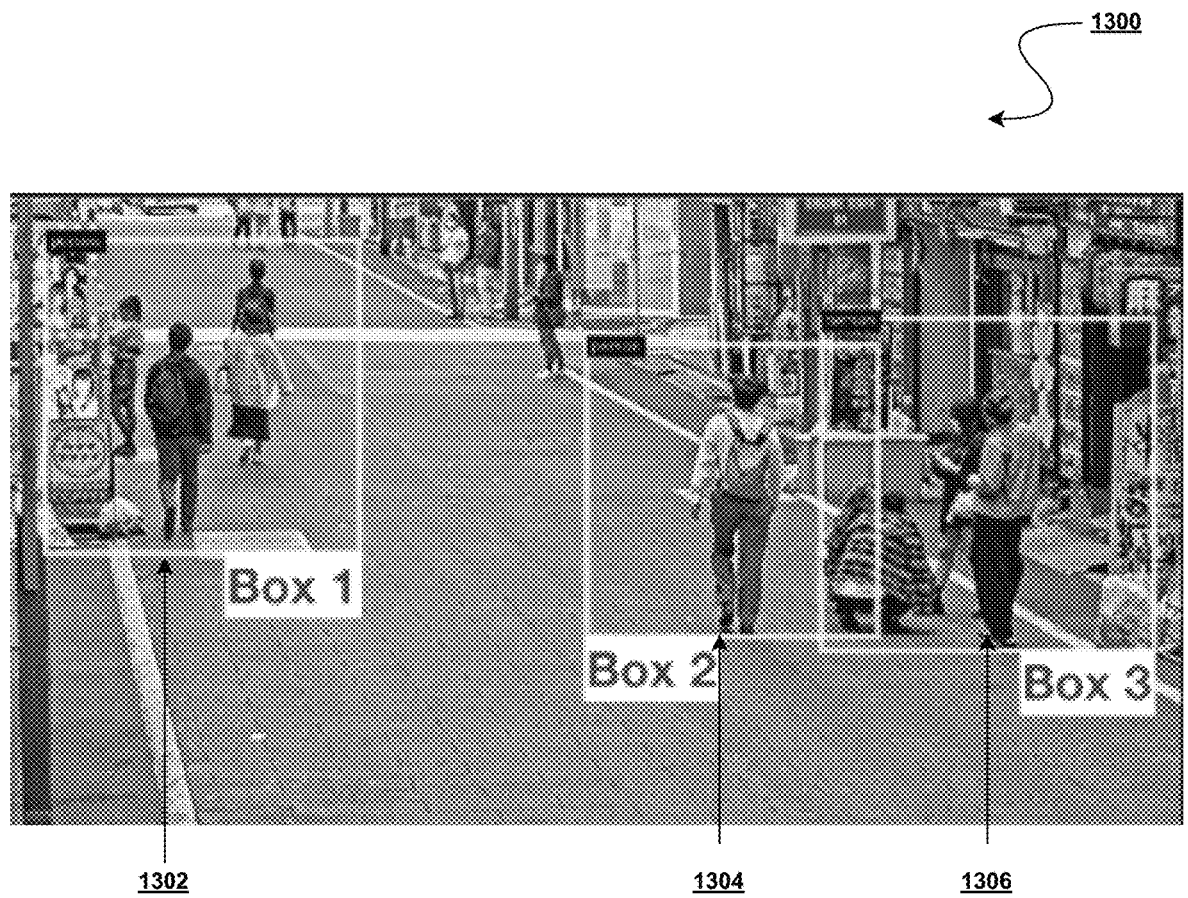
FIG. 13 is a video frame depicting bounding boxes after reduction, according to an embodiment of the invention.

FIG. 13 is a video frame 1300 depicting bounding boxes after reduction, according to an embodiment of the invention. Video frame 1300 depicts a scene from a marketplace captured by a surveillance camera 570. Four subjects have been defined using bounding boxes that may be merged into a single bounding box 1302. Bounding box 1304 depicts a subject with a bag. Bounding box 1306 captures two standing subjects and two other subjects who appear to be squatting on the road. The subjects in bounding box 1306 may have been defined using individual bounding boxes and may be merged into bounding box 1306. Bounding box 1304 defines a man walking with hands inside pockets. Although bounding boxes 1304 and 1306 are overlapping, they may not be merged as the size of the larger bounding box 1306 is greater than the second size threshold.

Figure 14A:
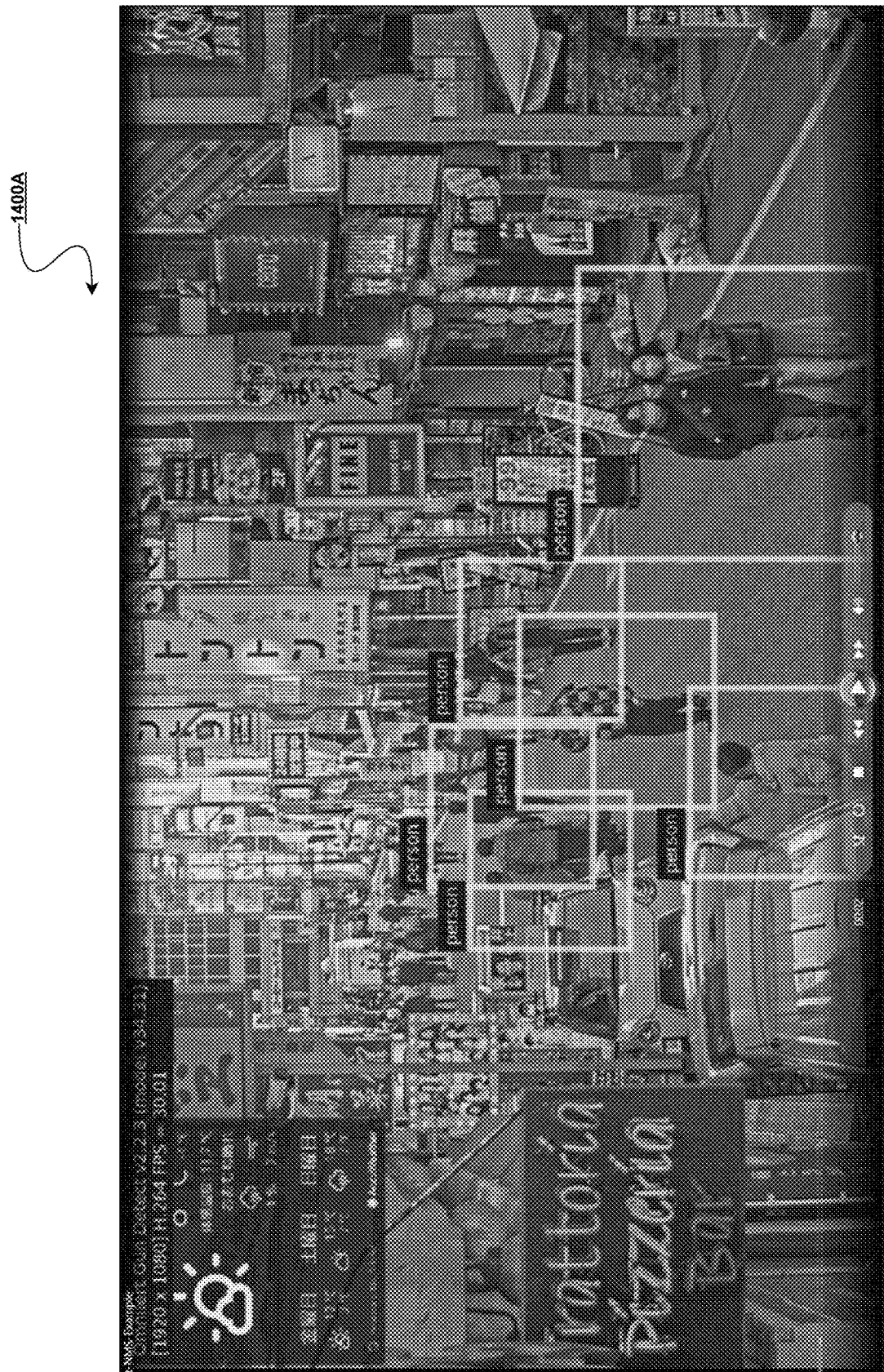
FIG. 14A depicts a screenshot of a video frame in which multiple subjects are defined using bounding boxes, according to an embodiment of the invention.

FIG. 14A depicts a screenshot of a video frame 1400A in which multiple subjects are defined using bounding boxes. Surveillance computer 510 may be configured to receive video frames from multiple cameras 570 and define bounding boxes around subjects present in the video frame using video analysis engine 525.

Figure 14B:
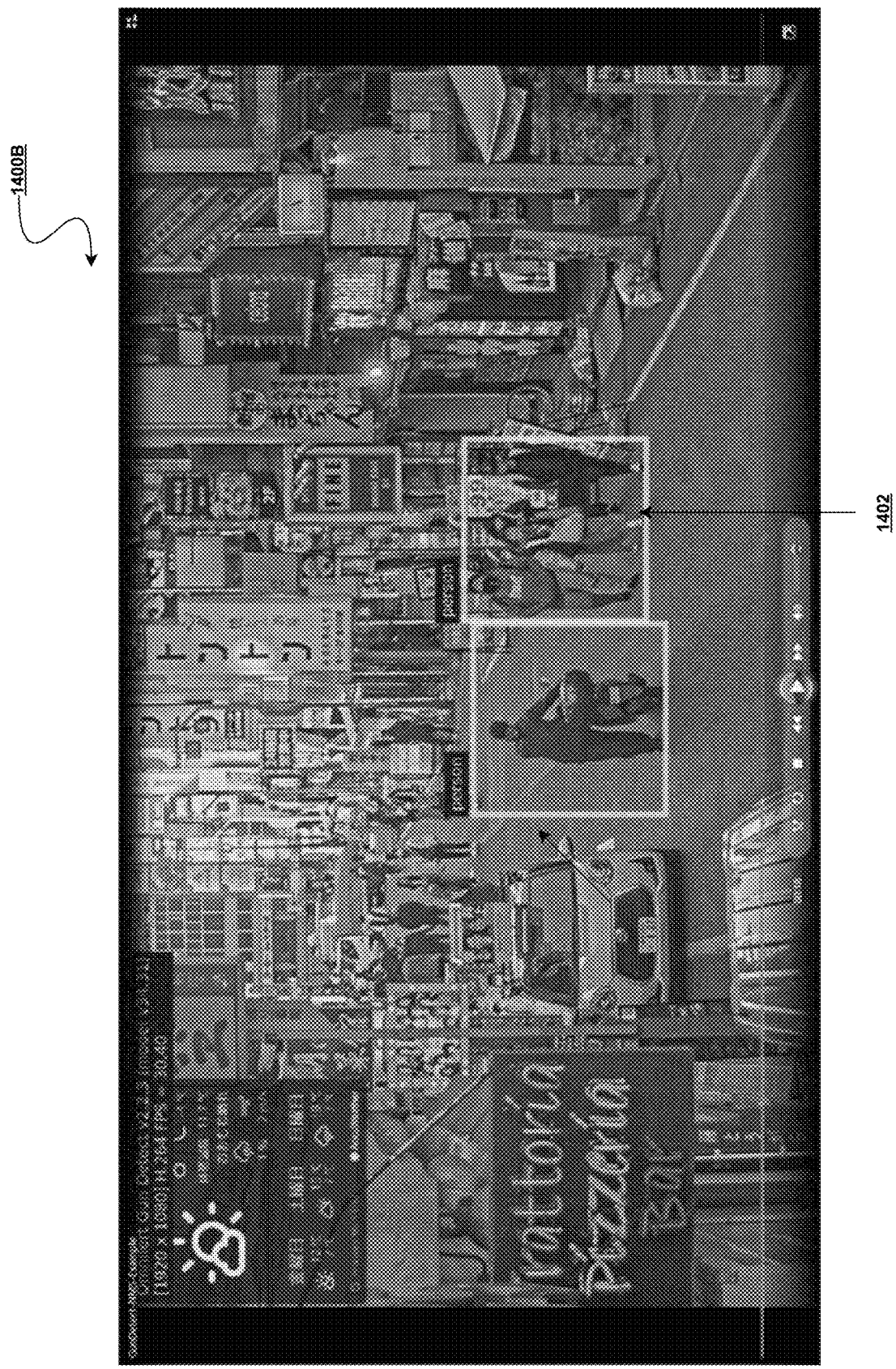
FIGS. 14B-14D depicts the process of surveillance and detection of objects using video frames, according to an embodiment of the invention.
Figure 14C:
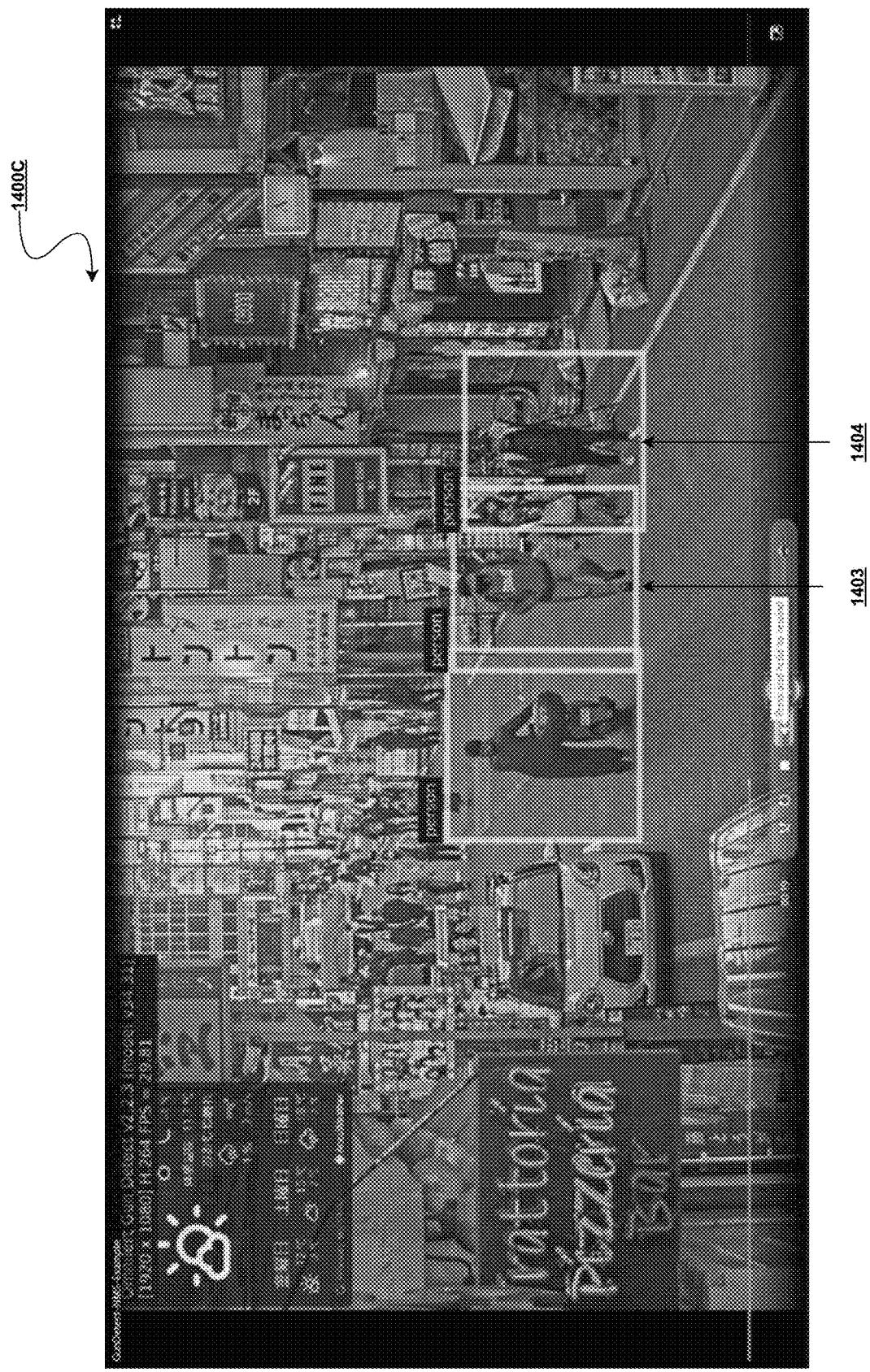
Figure 14D:
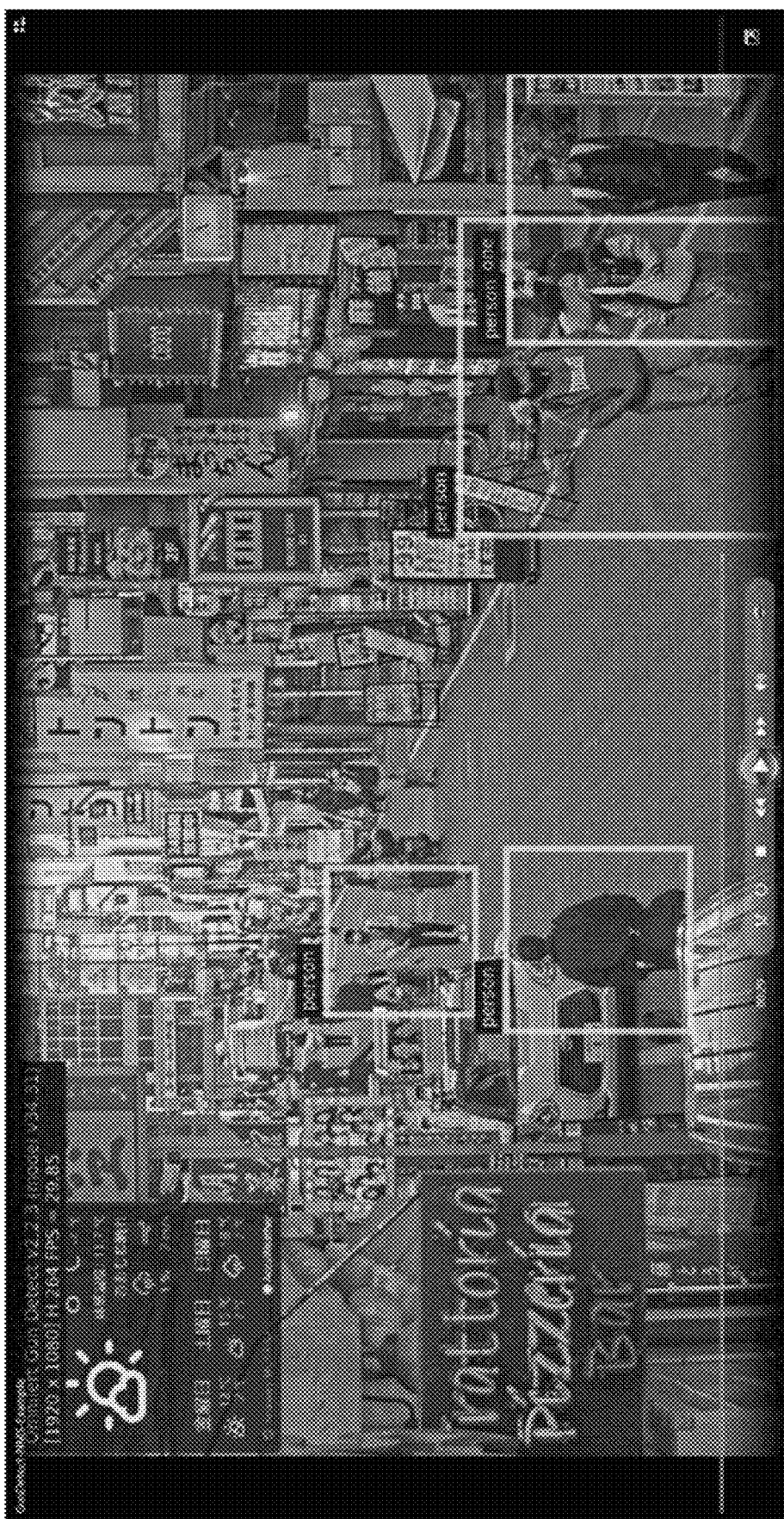

FIGS. 14B-14D depict the process of surveillance and detection of objects using video frames. FIG. 14B shows a video frame 1400B in which bounding box 1402 is defined around four subjects walking down the street. As they move down the street and closer to the camera, four people may be defined using two bounding boxes 1403 and 1404 in video frame 1400C in FIG. 14C. In FIG. 14D, object detector 566 analyzes the bounding boxes and determines that there are no suspicious objects held by any of the subjects.

Figure 14E:
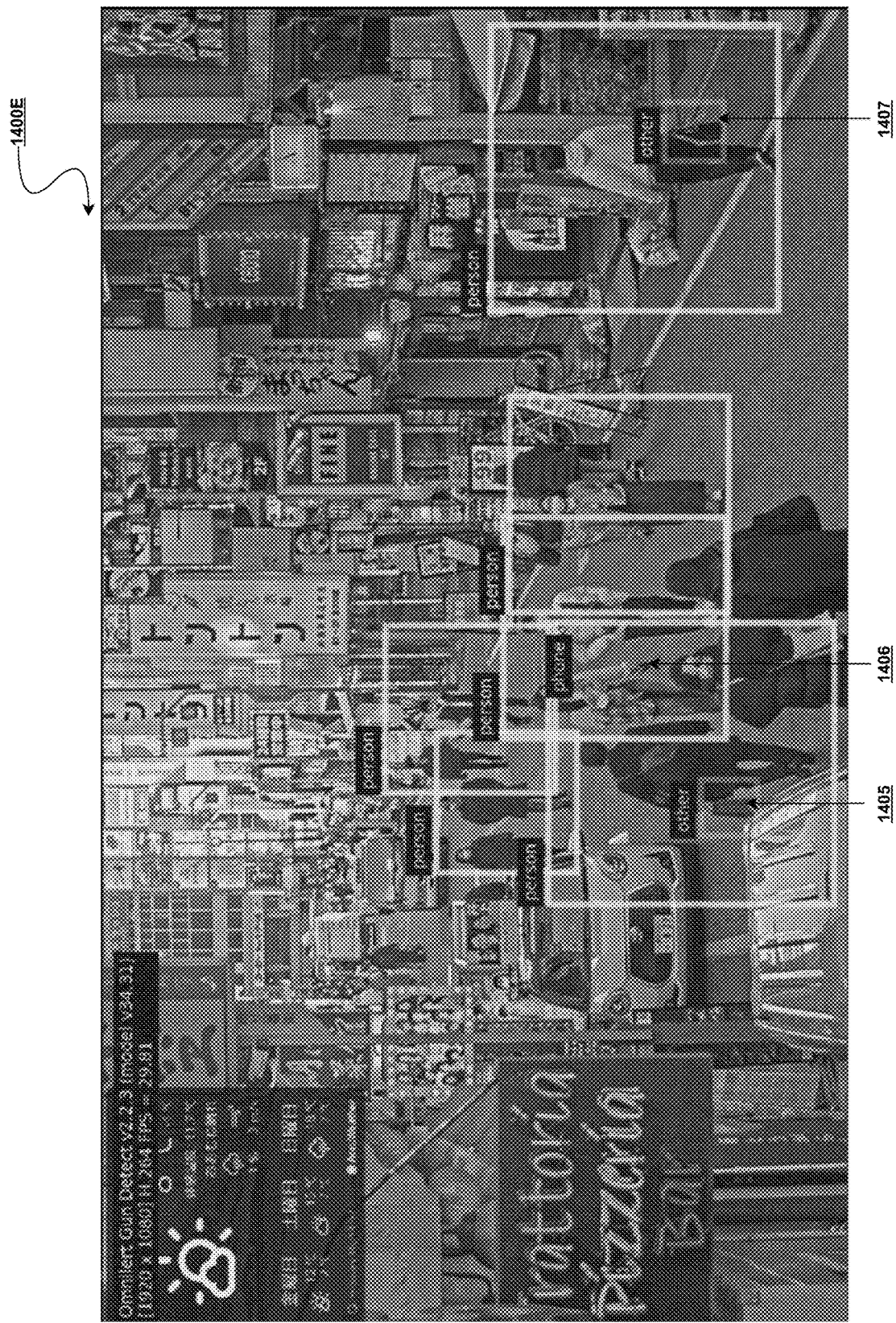
FIG. 14E depicts a screenshot of a video frame in which multiple subjects are defined and several objects are identified using bounding boxes.

FIG. 14E depicts a screenshot of a video frame 1400E in which multiple subjects are defined and several objects are identified using bounding boxes and object detection. Subjects in the video frame may be captured by bounding boxes. The bounding boxes are analyzed to detect objects. In FIG. 14E, three objects may be identified. The objects may be identified and classified as others as they are not suspicious. Object 1405 as seen in the video frame may be identified as a handbag. Object 1406 is identified as a phone held by a user. Object 1407 is identified as a bag carried by a user.

The skilled person will be aware of a range of possible modifications of the various embodiments described above. Accordingly, the present invention is defined by the claims and their equivalents.

What is claimed is:

1. A system for surveillance, the system comprising:
   a surveillance computer comprising a processor, a memory, and a plurality of programming instructions, the plurality of programming instructions when executed by the processor cause the processor to:
   receive and store video frames in the memory;
   define, in a video frame among the video frames, a plurality of bounding boxes to visually bound one or more subjects, each bounding box of the plurality of bounding boxes is defined in accordance to a pre-defined aspect ratio, and wherein the plurality of bounding boxes comprises padding above and laterally with respect to the one or more subjects in the video frame; and
   reduce the plurality of bounding boxes by merging two bounding boxes among the plurality of bounding boxes to create a merged bounding box, wherein the merged bounding box maintains the pre-defined aspect ratio and visually bounds the two bounding boxes being merged, wherein each of the reduced plurality of merged bounding boxes comprise an additional area surrounding the one or more subjects, and wherein the reduced plurality of bounding boxes are used for object detection.

2. The system of claim 1, wherein the plurality of programming instructions when executed by the processor, further cause the processor to:
   responsive to detection of a weapon associated with a subject in the plurality of bounding boxes, generating an alert; and
   transmit and render the video frame on a display of a user device.

3. The system of claim 1, wherein to create one or more of the merged bounding boxes the plurality of programming instructions when executed by the processor, further causes the processor to identify a degree of overlap between the two or more bounding boxes considered for merging, an initial size of the two or more bounding boxes, and a final size of the merged bounding box.

4. The system of claim 1, wherein the plurality of programming instructions when executed by the processor, further cause the processor to:
responsive to determining that a number of the plurality of bounding boxes is below a bounding box threshold, skip reduction of the plurality of bounding boxes.

5. The system of claim 1, wherein the pre-defined aspect ratio is based on the object detection mechanism used by the surveillance computer.

6. The system of claim 1, wherein the padding above and laterally with respect to the one or more subjects in the video frame captures objects held by the one of more subjects.

7. The system of claim 1, wherein the plurality of programming instructions when executed by the processor, further cause the processor to visually bound maximum number of identified subjects in minimal number of merged bounding boxes by reducing the plurality of bounding boxes.

8. The system of claim 1, wherein the one or more merged bounding boxes are square.

9. The system of claim 1, wherein the plurality of programming instructions when executed by the processor, further cause the processor to remove duplicate bounding boxes among the plurality of bounding boxes.

10. The system of claim 1, the plurality of programming instructions when executed by the processor, further cause the processor to:
identify one or more bounding boxes among the plurality of bounding boxes covering a same one or more subjects; and
remove duplicates from the identified one or more bounding boxes.

11. A computer-implemented method for surveillance, the method comprising:
receiving and storing store video frames in a memory of a surveillance computer;
defining in a video frame among the video frames, a plurality of bounding boxes to visually bound one or more subjects, each bounding box of the plurality of bounding boxes is defined in accordance to a pre-defined aspect ratio, and wherein the plurality of bounding boxes comprises padding above and laterally with respect to the one or more subjects in the video frame; and
reducing the plurality of bounding boxes by merging two bounding boxes among the plurality of bounding boxes to create a merged bounding box, wherein the merged bounding box maintains the pre-defined aspect ratio and visually bounds the two bounding boxes being merged, wherein each of the reduced plurality of merged bounding boxes comprises an additional area surrounding the one or more subjects, and wherein the reduced plurality of bounding boxes is provided to an object detector.

12. The computer-implemented method of claim 11, wherein the method further comprises the steps of:
responsive to detection of a weapon associated with a subject in the plurality of bounding boxes, generating an alert; and
transmitting and rendering the video frame on a display of a user device.

13. The computer-implemented method of claim 11, wherein creation of the one or more of the merged bounding boxes further comprises the steps of: identifying a degree of overlap between the two or more bounding boxes considered for merging, an initial size of the two or more bounding boxes, and a final size of the merged box.

14. The computer-implemented method of claim 11, the method further comprises the steps of:
responsive to determining that a number of plurality of bounding boxes is below a bounding box threshold, skipping the reduction of the plurality of bounding boxes.

15. The computer-implemented method of claim 11, wherein the pre-defined aspect ratio is based on the object detection mechanism used by the surveillance computer.

16. The computer-implemented method of claim 11, wherein the padding above and laterally with respect to one or more subjects in the video frame captures objects held by the one or more subjects.

17. The computer-implemented method of claim 11, the method comprising:
visually bounding maximum number of identified subjects in minimal number of merged bounding boxes by reducing the plurality of bounding boxes.

18. The computer-implemented method of claim 11, wherein the one or more merged bounding boxes are square.

19. The method of claim 11, wherein the method comprises removing duplicate bounding boxes among the plurality of bounding boxes.

20. The method of claim 11, wherein the method further comprises:
identifying one or more bounding boxes among the plurality of bounding boxes covering a same one or more subjects; and
removing duplicates from the identified one or more bounding boxes.

\* \* \* \* \*